United States Patent
Akselrod et al.

(10) Patent No.: US 11,914,266 B1
(45) Date of Patent: Feb. 27, 2024

(54) TUNABLE OPTICAL DEVICES WITH EXTENDED-DEPTH TUNABLE DIELECTRIC CAVITIES

(71) Applicant: Lumotive, Inc., Redmond, WA (US)

(72) Inventors: Gleb M. Akselrod, Kenmore, WA (US); Lie "Larry" Zhao, Washougal, WA (US); Erik Edward Josberger, Renton, WA (US); Laura Maria Pulido Mancera, Bellevue, WA (US); Linda Gail Conway, Duvall, WA (US); Prasad Padmanabha Iyer, Albuquerque, NM (US)

(73) Assignee: Lumotive, Inc., Redmond, WA (US)

( * ) Notice: Subject to any disclaimer, the term of this patent is extended or adjusted under 35 U.S.C. 154(b) by 0 days.

(21) Appl. No.: 18/329,526

(22) Filed: Jun. 5, 2023

(51) Int. Cl.
*G02F 1/29* (2006.01)
*C23C 22/73* (2006.01)
*C25D 5/34* (2006.01)

(52) U.S. Cl.
CPC .............. *G02F 1/292* (2013.01); *C23C 22/73* (2013.01); *C25D 5/34* (2013.01); *G02F 2202/30* (2013.01)

(58) Field of Classification Search
CPC ........ G02F 2202/30; G02F 1/29; G02F 1/292; G02F 2201/501; G02F 1/13312; G02F 1/133334; G02F 1/133382; G02F 1/31; G02F 2201/58; G02F 2203/15; G02F 2203/24; H01L 23/5286; H01L 23/535; H01L 23/528; H01L 21/76895; H01L 21/743; H01L 23/5226; H01L 21/823475; H01L 21/823871; H01L 27/0886; H01L 21/823431; H01L 29/66795; H01L 27/0924; H01L 23/481; H01L 29/41791; H01L 29/7848; H01L 21/8221; H01L 23/485; H01L 27/0688; H01L 27/092; H01L 27/1203; H01L 29/785; H01L 21/823821; H01L 21/76871; H01L 27/105; H01L 29/7851; H01L 21/0226; H01L 21/76816; H01L 27/0207; H01L 28/00; H01L 29/66825; H01L 21/76877; H01L 21/76892; H01L 23/5384; H01L 23/5386; H01L 21/3213; H01L 21/76801;
(Continued)

(56) References Cited

U.S. PATENT DOCUMENTS 10,451,800 B2  10/2019  Akselrod et al.
10,665,953 B1   5/2020  Akselrod et al.
(Continued)

*Primary Examiner* — Brandi N Thomas
(74) *Attorney, Agent, or Firm* — PCFB, LLC; Justin K. Flanagan

(57) ABSTRACT

In various embodiments, a tunable optical surface includes a dielectric substrate layer with an array of elongated metal rails extending from the dielectric substrate parallel to one another and spaced from one another to form channels therebetween. The channels are etched deeper into the dielectric substrate to form extended-depth channels. The depth of each extended-depth channel is greater than the height of adjacent elongated metal rails. The dimensions of the elongated metal rails and the extended-depth channels therebetween may be subwavelength with respect to an operational bandwidth. A tunable dielectric material that has a tunable refractive index, such as liquid crystal, is positioned within the extended-depth channels between adjacent elongated metal rails.

17 Claims, 20 Drawing Sheets

(58) Field of Classification Search
CPC ........... H01L 21/76897; H01L 23/5221; H01L 27/088; H01L 29/7845; H01L 21/84; H01L 23/53257; H01L 27/11803; H01L 27/1214; H01L 29/0649; H01L 29/66545; H01L 21/845; H01L 27/1211; H01L 2924/0002; H01L 2027/11875; H01L 21/76224; H01L 21/823807; H01L 23/5283; H01L 25/0657; H01L 27/11807; H01L 29/0673; H01L 29/0847; H01L 29/401; H01L 29/42324; H01L 29/42392; H01L 29/66439; H01L 29/775; H01L 29/7831; H01L 29/7855; H01L 2027/11881; H01L 21/28525; H01L 21/28568; H01L 21/31053; H01L 21/76251; H01L 21/76819; H01L 21/76843; H01L 21/76898; H01L 21/823828; H01L 2224/48091; H01L 2224/48227; H01L 23/48; H01L 23/5227; H01L 23/53209; H01L 23/53271; H01L 23/5329; H01L 27/0922; H01L 27/12; H01L 28/10; H01L 29/0626; H01L 29/0653; H01L 29/0661; H01L 29/1079; H01L 29/16; H01L 29/1604; H01L 29/42332; H01L 29/42364; H01L 29/511; H01L 29/513; H01L 29/517; H01L 29/518; H01L 29/66833; H01L 29/7391; H01L 29/78642; H01L 29/7881; H01L 29/7889; H01L 29/792; H01L 29/7926; H01L 29/861; H01L 29/8616; H01L 2924/00; H01L 2924/014; H01L 2027/11861; H01L 2027/11862; H01L 2029/7858; H01L 21/02255; H01L 21/02532; H01L 21/02603; H01L 21/027; H01L 21/52; H01L 21/76254; H01L 21/768; H01L 21/76807; H01L 21/76832; H01L 21/76838; H01L 21/7684; H01L 21/823412; H01L 21/823437; H01L 21/823814; H01L 21/82385; H01L 21/823864; H01L 21/823885; H01L 22/00; H01L 2224/16225; H01L 2224/85; H01L 2224/97; H01L 23/367; H01L 23/50; H01L 23/522; H01L 23/5222; H01L 24/04; H01L 24/18; H01L 24/19; H01L 24/43; H01L 24/97; H01L 27/0203; H01L 29/0669; H01L 29/0684; H01L 29/165; H01L 29/41733; H01L 29/66553; H01L 29/6656; H01L 29/78696; H01L 2924/00014; H01L 2924/01005; H01L 2924/01006; H01L 2924/01033; H01L 2924/01077; H01L 2924/01079; H01L 2924/01082; H01L 2924/12041; H01L 2924/14; H01L 2924/15311; H01L 2924/19041; H01L 31/022425; H01L 31/022466; H01L 31/042; H01L 31/18; H01L 31/1884; H01L 33/62; H01L 21/28008; H01L 21/28141; H01L 21/31105; H01L 21/3111; H01L 21/4871; H01L 21/4885; H01L 21/76243; H01L 21/76804; H01L 21/76805; H01L 21/76837; H01L 21/7687; H01L 21/73879; H01L 21/823468; H01L 21/823481; H01L 21/823857; H01L 2224/02135; H01L 2224/022; H01L 2224/02205; H01L 2224/02215; H01L 2224/10156; H01L 2224/10165; H01L 2224/10175; H01L 2224/131; H01L 2224/16145; H01L 2224/16237; H01L 2224/16238; H01L 2224/17181; H01L 2224/32145; H01L 2224/32225; H01L 2224/33181; H01L 2224/73204; H01L 2224/81007; H01L 2224/81009; H01L 2224/81191; H01L 2224/81907; H01L 2225/06513; H01L 2225/06517; H01L 2225/06565; H01L 2225/06589; H01L 23/36; H01L 23/3736; H01L 23/488; H01L 23/49805; H01L 23/49827; H01L 23/49838; H01L 23/53266; H01L 23/53276; H01L 24/03; H01L 24/08; H01L 24/10; H01L 24/13; H01L 24/16; H01L 24/81; H01L 27/0285; H01L 27/0611; H01L 27/0705; H01L 27/08; H01L 27/0883; H01L 29/0665; H01L 29/4234; H01L 29/66295; H01L 29/78; H01L 29/783; H01L 2924/15331; H01L 31/0481; H01L 31/049
See application file for complete search history.

(56) References Cited

U.S. PATENT DOCUMENTS

| | | |
|---|---|---|
| 10,915,002 B2 | 2/2021 | Akselrod |
| 10,968,522 B2 | 4/2021 | Akselrod et al. |
| 11,037,973 B2 | 6/2021 | Akselrod |
| 11,092,675 B2 | 8/2021 | Akselrod et al. |
| 11,429,008 B1 | 8/2022 | Akselrod et al. |
| 2012/0194399 A1 | 8/2012 | Bily et al. |
| 2014/0266946 A1 | 9/2014 | Bily et al. |
| 2015/0162658 A1 | 6/2015 | Bowers et al. |
| 2015/0318618 A1 | 11/2015 | Chen et al. |
| 2015/0318620 A1 | 11/2015 | Black et al. |
| 2015/0372389 A1 | 12/2015 | Chen et al. |
| 2015/0380828 A1 | 12/2015 | Black et al. |
| 2018/0239021 A1 | 8/2018 | Akselrod et al. |
| 2018/0239213 A1 | 8/2018 | Akselrod et al. |
| 2018/0241131 A1 | 8/2018 | Akselrod et al. |
| 2018/0248267 A1 | 8/2018 | Akselrod et al. |
| 2018/0351093 A1* | 12/2018 | Wu ................... H10N 70/8833 |
| 2019/0285798 A1* | 9/2019 | Akselrod ............... G02B 5/008 |
| 2019/0301025 A1 | 10/2019 | Akselrod et al. |

* cited by examiner

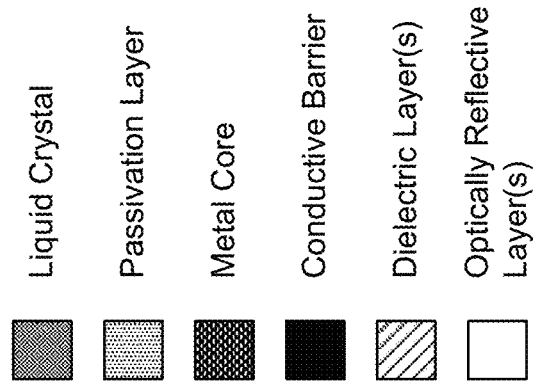
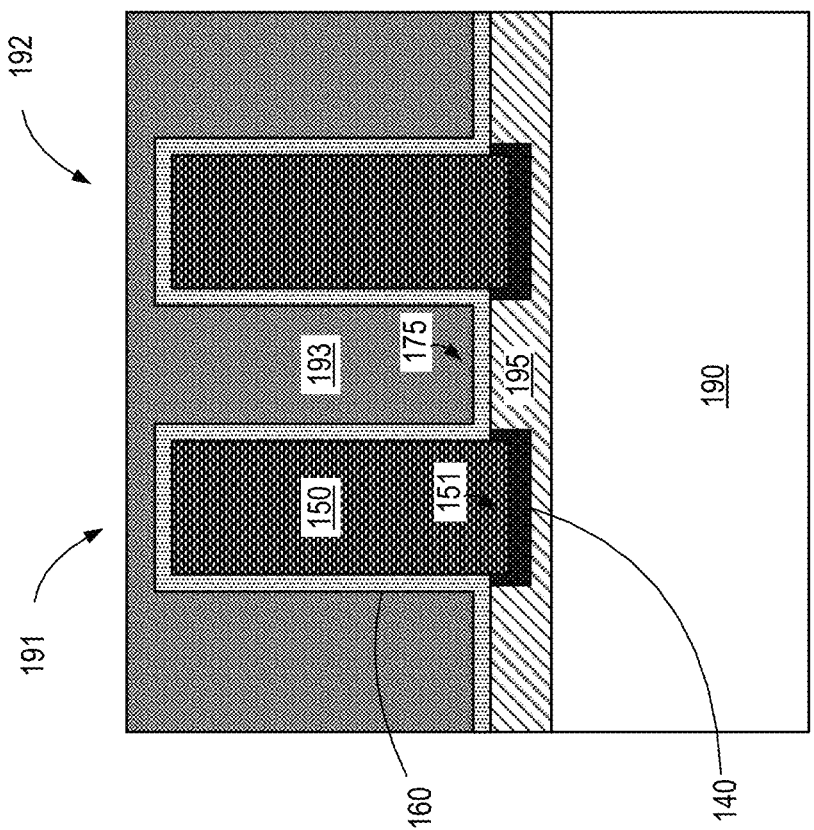
FIG. 1C

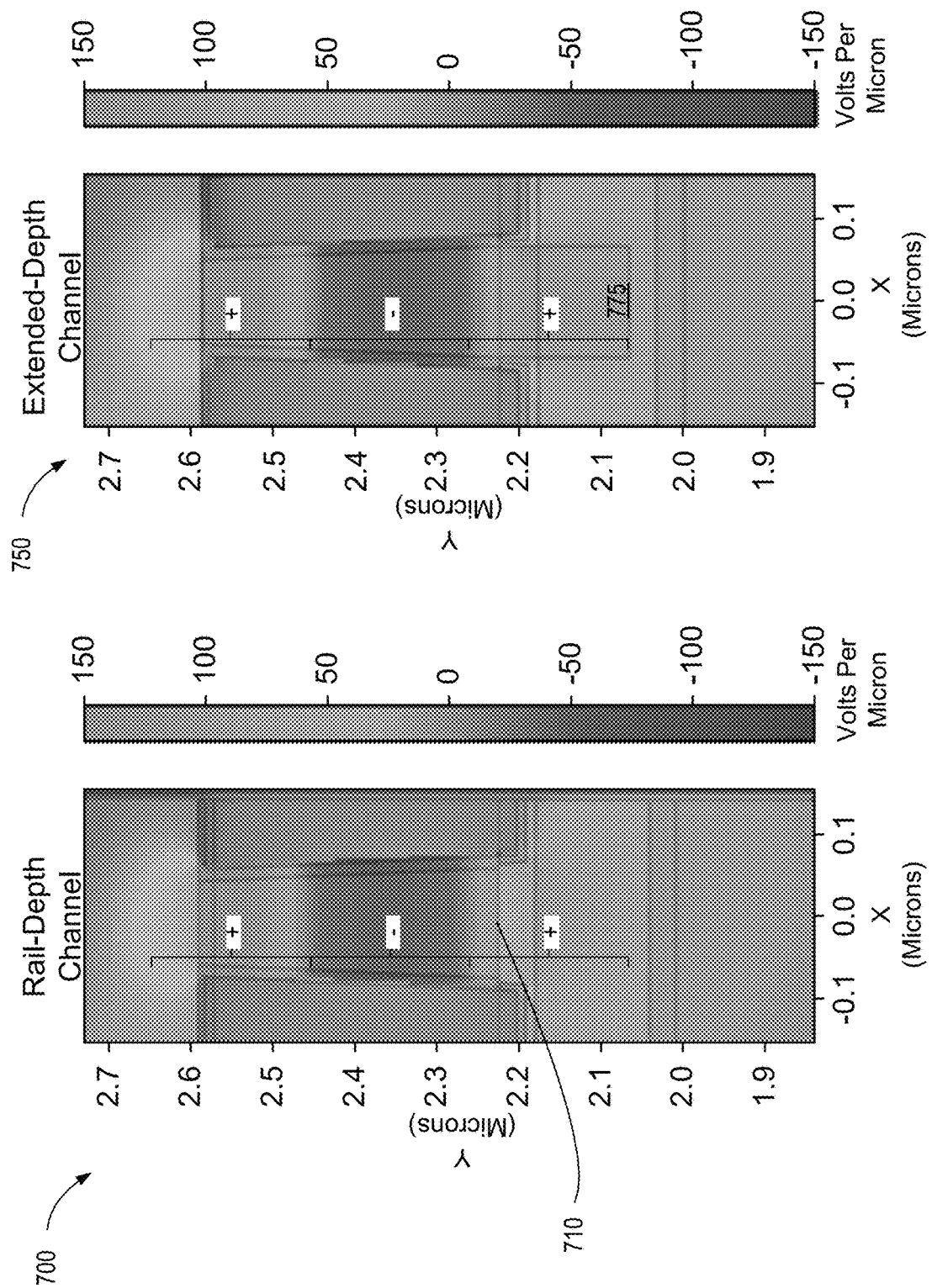

ically applies a pattern of voltages to an array of optical structures. Voltage differentials across adjacent optical structures modify the refractive indices of dielectric material therebetween. A combination of phase delays created by the pattern of applied voltages creates constructive interference in the desired beam steering direction.

TUNABLE OPTICAL DEVICES WITH EXTENDED-DEPTH TUNABLE DIELECTRIC CAVITIES

TECHNICAL FIELD

This disclosure relates to optical metasurfaces, reflectors, deflectors, and antenna elements, including tunable optical metasurfaces.

BRIEF DESCRIPTION OF THE DRAWINGS

FIG. 1C illustrates a diagram of a two-dimensional cross-section of liquid crystal positioned between two parallel elongated metal rails of a tunable metasurface, according to one embodiment.

FIG. 7A illustrates a diagram of simulated electric field values within a channel between two metal rails, according to one embodiment.

FIG. 7B illustrates a diagram of simulated electric field values within an extended-depth channel between two metal rails, according to one embodiment.

DETAILED DESCRIPTION

Figure 1A:
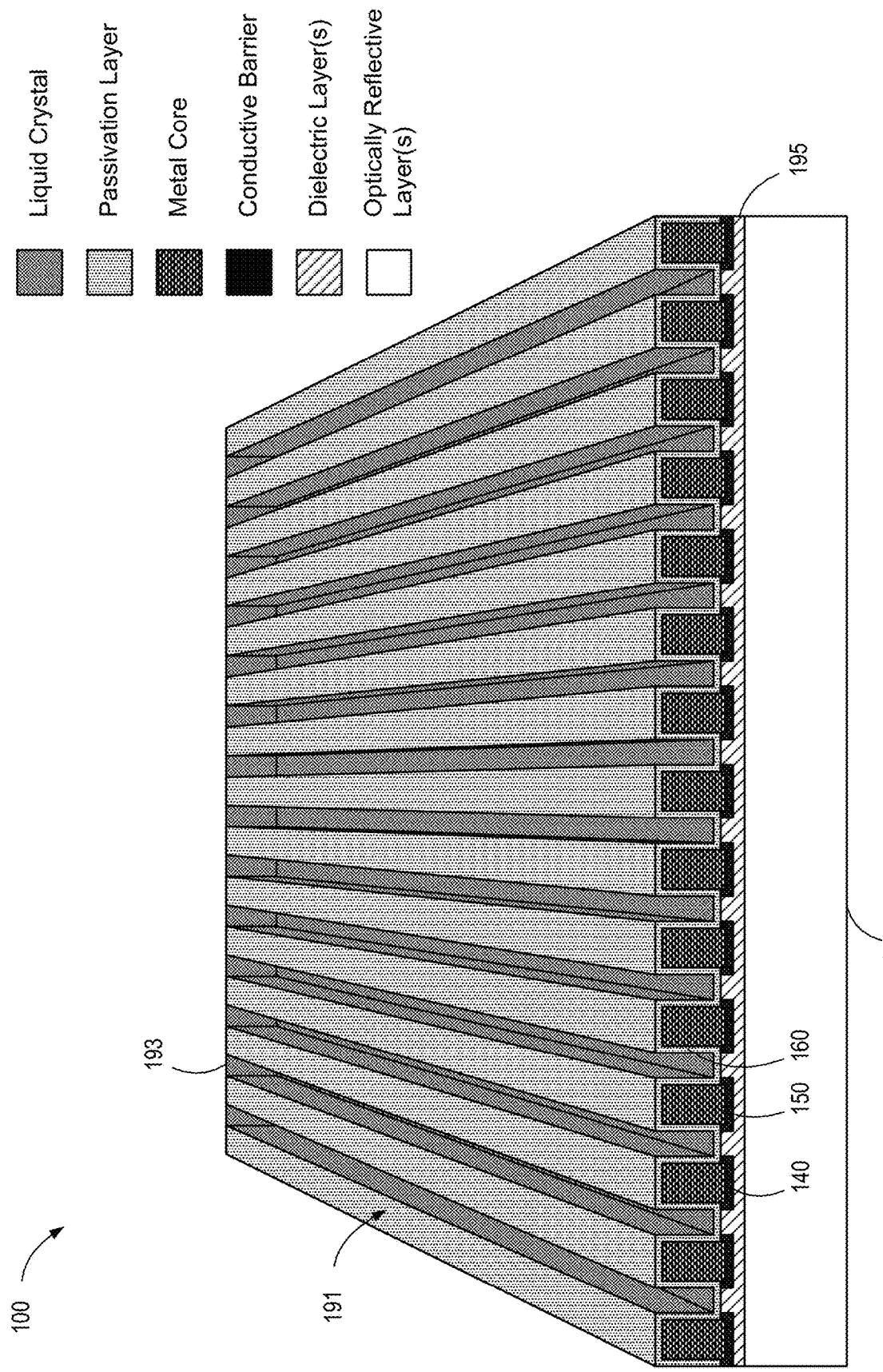
FIG. 1A illustrates an example diagram of a tunable metasurface, according to one embodiment.

Tunable optical metasurfaces may be used for beamforming, including three-dimensional beam shaping, two-dimensional beam steering, and/or one-dimensional beam steering. The presently described systems and methods can be applied to tunable metasurfaces utilizing various architectures and designs to deflect optical radiation within an operational bandwidth. In various embodiments, a controller or metasurface driver selectively applies a pattern of voltages to an array of optical structures. Voltage differentials across adjacent optical structures modify the refractive indices of dielectric material therebetween. A combination of phase delays created by the pattern of applied voltages creates constructive interference in the desired beam steering direction.

Various examples of tunable optical metasurfaces are described herein and depicted in the figures. For example, a tunable optical metasurface includes an array of metal elements (e.g., antenna elements, resonator elements, elongated resonator rails, metal pillar pairs, etc.). For instance, in some embodiments, the array of metal elements comprises a one-dimensional array of elongated metal resonator rails arranged parallel to one another with respect to an optical reflector, such as an optically reflective layer of metal or a Bragg reflector. Liquid crystal, or another refractive index tunable dielectric material, is positioned in the cavities (e.g., gaps or channels) between adjacent resonator rails or other metal elements. Liquid crystal is used in many of the examples provided in this disclosure. However, it is appreciated that alternative dielectric materials with tunable refractive indices and/or combinations of different dielectric materials with tunable refractive indices may be utilized instead of liquid crystal in many instances. Examples of suitable tunable dielectric materials that have tunable refractive indices include liquid crystals, electro-optic polymer, chalcogenide glasses, and/or various semiconductor materials.

According to various embodiments in which the metal elements are embodied as elongated metal rails, the liquid crystal or other tunable dielectric material may be deposited within channels defined by adjacent pairs of elongated metal rails to at least partially fill each channel to completely fill each channel to a height of each elongated metal rail, to completely fill each channel to the height of a passivation coating on each elongated metal rail, and/or overfill the channels such that a layer of liquid crystal or other tunable dielectric material is positioned above the array of elongated metal rails. While outside the scope of this disclosure, the liquid crystal or other tunable dielectric material may be sealed within the channels by an optically transparent cover (e.g., a glass, sapphire, or transparent dielectric cover), as described in greater detail in the disclosures incorporated by reference herein.

In various embodiments, biasing the liquid crystal in a metasurface with a pattern of voltage biases changes the reflection phase of the optical radiation. For example, each different voltage pattern applied across the metasurface corresponds to a different reflection phase pattern. Each different reflection phase pattern of a one-dimensional array of optical structures (e.g., elongated metal resonator rails) corresponds to a different steering angle in a single dimension. Each different reflection phase pattern of a two-dimensional array of optical structures (e.g., metal pillars) corresponds to unique steering angles in two dimensions. A digital or analog controller (controlling current and/or voltage), such as a metasurface driver, may apply a differential voltage bias pattern to achieve a target beam shaping, such as a target beam steering angle. The term "beam shaping" is used herein in a broad sense to encompass one-dimensional beam steering, two-dimensional beam steering, wavelength filtering, beam divergence, beam convergence, beam focusing, and/or controlled deflection, refraction, and/or reflection of incident optical radiation.

Some examples of the systems and methods described herein include a tunable optical device with a one-dimensional or two-dimensional array of metal elements extending from a dielectric substrate. The metal elements may be arranged parallel to one another in one or two dimensions (e.g., in a grid pattern) and spaced from one another to form gaps between adjacent metal elements. The widths of the metal elements may be subwavelength, such that the width of each metal element is less than a wavelength within the operational bandwidth of the tunable optical device. Similarly, the distance between adjacent metal elements may also be subwavelength, such that each of the gaps has a subwavelength width.

According to various embodiments, each metal element can be defined as having a base wall, substantially parallel sidewalls, and a top wall. In various embodiments, a passivation coating may be applied or otherwise deposited to one or more of the sidewalls and/or a top wall of each metal element. In various embodiments, a plurality of gap extensions is formed within the dielectric substrate from which the metal elements extend. Each gap extension is aligned with and positioned beneath a corresponding gap defined by adjacent metal elements so as to form a plurality of extended-depth gaps. As such, the tunable optical device includes a plurality of metal elements extended from a dielectric substrate with extended-depth gaps that extend into the dielectric substrate. The tunable dielectric material is positioned within the extended-depth gaps to fill each gap and the corresponding gap extension.

Some examples of the systems and methods described herein include a tunable optical device with an array of elongated metal rails extending from a dielectric substrate. The elongated metal rails may be arranged parallel to one another and spaced from one another to form channels therebetween. The widths of the elongated metal rails may be subwavelength, such that the width is less than a wavelength within the operational bandwidth of the tunable optical device. Similarly, the channel widths between adjacent elongated metal rails may also be subwavelength.

A plurality of channel extensions may be formed (e.g., etched) into the dielectric substrate. Each channel extension may be aligned with and positioned beneath a corresponding channel defined by adjacent elongated metal rails to form extended-depth channels. Each extended-depth channel can be defined as having a depth defined from the top walls of the adjacent elongated metal rails to the base wall or bottom of each channel extension. As the channel extensions are etched or otherwise formed into the dielectric substrate from which the elongated metal rails extend, the depth of each extended-depth channel is greater than the rail height of the associated elongated metal rails.

According to various embodiments, each elongated metal rail can be defined as having a base wall, substantially parallel sidewalls, and a top wall. One or more of the sidewalls and top wall of each elongated metal rail may be coated with a passivation coating, such as a silicon nitride (SiN) layer. In some embodiments, the passivation coating may be applied or otherwise deposited within a vacuum or within an inert gas system, such that the passivation coating is applied before oxidation, or other corrosion, affects the exposed metal.

The elongated metal rails are illustrated and described in many instances as being copper or as including copper (e.g., a copper alloy). Copper elements and copper elongated rails may, for example, be fabricated using modified damascene processes for semiconductor devices. However, it is appreciated that other metals may also be utilized, including but not limited to tungsten, aluminum, copper alloys, and/or combinations thereof.

In various examples, a conductive barrier material is positioned between the base wall of each elongated metal rail (or another metal element) and the underlying dielectric substrate. The conductive barrier material may be, for example, tantalum (Ta), tantalum nitride (TaN), titanium nitride (TiN), and/or a combination thereof. Alternative conductive barrier metals, metallic materials, and/or doped semiconductor materials may be used in place of or in addition to Ta-based conductive barrier materials.

A tunable dielectric material that has a tunable refractive index (e.g., liquid crystal, as described above) is positioned within the extended-depth channels between adjacent elongated metal rails to fill each respective channel and corresponding channel extension. As described above, the tunable dielectric material deposited within the extended-depth channels between adjacent elongated metal rails may include liquid crystal, an electro-optic polymer, a chalcogenide glass, and/or a tunable semiconductor material.

The passivation coating may be deposited on the tunable optical device as a single or uniform layer that covers the sidewalls and top wall of each elongated metal rail and the base or lower surface of each channel. The passivation coating may be, for example, a thin silicon nitride (SiN) layer, silicon carbide nitride, silicon carbide, aluminum oxide ($AlO_x$), hafnium oxide ($HfO_2$, silicon oxide ($SiO_2$), aluminum nitride (AlN), boron nitride (BN), and/or another passivating dielectric material. The passivation coating may be optically transparent for wavelengths within the operational bandwidth of the metasurface.

The various tunable metasurface devices described herein can be manufactured using various semiconductor manufacturing processes including, but not limited to, damascene processes, deposition processes, etching processes, lithography processes, patterning processes, chemical mechanical planarization processes, and the like. One example manufacturing process includes etching a dielectric layer to form an array of parallel elongated trenches in the dielectric layer. Each elongated trench may have substantially vertical sidewalls separated by a base wall that has a width less than a wavelength in an operational bandwidth of the tunable metasurface.

A conductive barrier material (e.g., tantalum (Ta), tantalum nitride (TaN), and titanium nitride (TiN)) may be deposited to cover at least the base wall of each elongated trench. In some instances, the conductive barrier material may be deposited to cover the base wall of each elongated trench along with the sidewalls and other exposed surfaces between adjacent trenches.

Each elongated trench may be filled with a conductive metal, such as copper. In some embodiments, a seed layer of copper (or other conductive metal seed layer) may be deposited first, and then the remainder (e.g., the remaining volume) of each trench may be filled with copper (or other conductive metal). The material between the elongated trenches (e.g., dielectric material and/or previously deposited conductive barrier material) is removed via, for example, chemical etching to expose the conductive metal as an array of parallel elongated metal rails with channels therebetween. Each elongated metal rail includes exposed sidewalls, an exposed top wall, and a base wall separated from the dielectric layer by a region of the conductive barrier material.

A channel extension may be etched in the dielectric layer at the base of each channel (e.g., via a dry etch process) to form extended-depth channels. The depth of each extended-depth channel, D, may be defined from the top wall of adjacent elongated metal rails to a base wall of the channel extension etched into the dielectric layer. As such, the depth, D, of each extended-depth channel is greater than the height, H, to which each of the elongated metal rails extends from the dielectric layer. In some embodiments, the height, H, of each elongated metal rail is less a wavelength in the operational bandwidth of the metasurface, such that the height of each elongated metal rail is describable as "subwavelength." Accordingly, the channel portion of each extended-depth channel also has subwavelength dimensions, having a channel depth that is less than a wavelength in the operational bandwidth of the metasurface.

The channel extension portion of each extended-depth channel may also have subwavelength dimensions, having an extension depth that is also less than a wavelength in the operational bandwidth of the metasurface. In some embodiments, the combined depth of the extended-depth channel (e.g., the channel depth added to the extension depth) may also be subwavelength, having a combined depth that is less than a wavelength in the operational bandwidth of the metasurface. In other embodiments, the combined depth of the extended-depth channel (e.g., the channel depth added to the extension depth) is greater than the largest wavelength in the operational bandwidth of the metasurface.

According to various embodiments, the channel extension may be etched into the dielectric layer to an extension depth defined in terms of the channel depth of the channel initially defined between adjacent elongated metal rails. For example, the channel extension may be etched to an extension depth that is less than 50% of the initial channel depth, such that the depth of the extended-depth channel is between 100% and 150% of the initial channel depth. The extended-depth channels are filled with a tunable dielectric material that has a tunable refractive index, such as liquid crystal or another of the tunable dielectrics described herein.

In some instances, removing material between the elongated trenches to expose the conductive metal as the array of parallel elongated metal rails may include planarizing the deposited materials via chemical mechanical planarization (CMP) to remove the deposited conductive barrier material and conductive metal between adjacent elongated trenches filled with the conductive metal. After the chemical mechanical planarization, wet etching may be used to remove the dielectric layer(s) and/or conductive barrier material(s) between the elongated trenches to expose the array of parallel elongated metal rails (e.g., the copper metal rails). In some embodiments, etching the channels between adjacent elongated metal rails to form extended-depth channels may be performed as a continuation of the CMP and wet etching process used to remove the material between the elongated trenches. In other embodiments, etching the channels between adjacent elongated metal rails to form extended-depth channels may be performed as a separate etching stage. For example, the channel extensions may be etched using a dry etch process.

In some embodiments, the dielectric layer that is etched to form the trenches may include multiple dielectric sublayers, one of which is a dielectric etch-stop sublayer to control a depth to which the parallel elongated trenches are etched into the dielectric layer. In other embodiments, the depth to which the trenches are etched into the dielectric layer is controlled based on the etching solution and/or etching time.

Many of the embodiments described and illustrated herein are described in the context of one-dimensional arrays of elongated metal rails. In some such embodiments, the width of each elongated metal rail may be subwavelength (e.g., 100-500 nanometers, depending on the operational bandwidth), while the length of each elongated metal rail may be on the order of tens or hundreds of microns, centimeters, or even tens of centimeters. However, it is also appreciated that two-dimensional arrays of elongated metal rails may be utilized. The length of each elongated metal rail, according to any of the embodiments described herein, may also have subwavelength dimensions. Such embodiments may be referred to herein as a metal element, a metal resonator element, a metal antenna resonator element, or the like that has subwavelength width, length, and height dimensions.

In one example, a two-dimensionally steerable tunable optical device may include a two-dimensional array of metal antenna elements (e.g., circular pillars, rectangular pillars, square pillars, etc.) extending from a dielectric substrate. The metal antenna elements may be spaced from one another by less than a wavelength of an operational bandwidth to form subwavelength gaps between adjacent or neighboring metal antenna elements. Gap extensions may be formed in the underlying dielectric to form extended-depth gaps that can be filled with a tunable dielectric material with a tunable refractive index, such as liquid crystal. Alternatively, the tunable dielectric material may be deposited over the entire surface to fill the extended-depth gaps and all other voids and spaces between adjacent metal antenna elements in one specific direction or in both directions along the two-dimensional array of metal antenna elements.

This disclosure includes various embodiments and variations of tunable optical metasurface devices and methods for manufacturing the same. It is appreciated that the metasurface technologies described herein may incorporate or otherwise leverage prior advancements in surface scattering antennas, such as those described in U.S. Patent Publication Nos. 2012/0194399, 2019/0285798, and 2018/0241131, which publications are hereby incorporated by reference in their entireties. Additional elements, applications, and features of surface scattering antennas are described in U.S. Patent Publication Nos. 2014/0266946, 2015/0318618, 2015/0318620, 2015/0380828, 2015/0162658, and 2015/0372389, each of which is hereby incorporated by reference in its entirety.

In various embodiments, the elongated metal rails have subwavelength dimensions suitable for operation within a specific bandwidth of optical frequencies (e.g., a bandwidth of infrared optical frequencies). The width of each elongated metal rail may be, for example, less than the smallest wavelength of the operational bandwidth. Similarly, each elongated metal rail may extend from the dielectric substrate to a height less than the smallest wavelength of the operational bandwidth. Specific descriptions of optical resonant antenna configurations, feature sizes, and manufacturing techniques are described in U.S. Patent Publication No. 2019/0301025 and U.S. patent application Ser. Nos. 15/900,683, 15/924,744, and 17/685,621, each of which is also hereby incorporated by reference in its entirety.

Examples of metasurfaces are described herein that can be used for transmitting or receiving. Systems incorporating the metasurfaces described herein may be operated as only a transmitter, as only a receiver, simultaneously as a transmitter and receiver, as a time-multiplexed transmitter/receiver, as a frequency-multiplexed transmitter/receiver, with the first metasurface acting as a transmitter and a second metasurface acting as a receiver, or in another transmit/receive configuration or operation technique. Additionally, the metasurfaces described herein may be used to control, tune, or modify reflection phase patterns. For example, one or more metasurfaces may be used to control (i) the reflection phase, (ii) the reflection amplitude, or (iii) the reflection phase and the reflection/transmission amplitude of a signal. Accordingly, a metasurface may be utilized in any of the embodiments described herein to control the complex phase and/or complex amplitude of reflected optical radiation.

Any of the variously described embodiments herein may be manufactured with dimensions suitable for optical bandwidths for optical sensing systems such as LiDAR, optical communications systems, optical computing systems, and displays. For example, the systems and methods described herein can be configured with metasurfaces that operate in the sub-infrared, mid-infrared, high-infrared, and/or visible-frequency ranges (generally referred to herein as "optical"). Given the feature sizes needed for sub-wavelength optical antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any aspect of any embodiment described herein may be combined with any other aspect of any other embodiment described herein or in the other disclosures incorporated by reference, including all permutations and combinations thereof, consistent with the understanding of one of skill in the art reading this disclosure in the context of such other disclosures.

To the extent used herein, a computing device, system, subsystem, module, driver, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), a programmable logic device (PLD), field-programmable gate array (FPGA), or another customizable and/or programmable device. The computing device may also include a machine-readable storage device, such as non-volatile memory, static RAM, dynamic RAM, ROM, magnetic memory, optical memory, flash memory, or another transitory or non-transitory machine-readable storage media. Various aspects of some embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once, except as explicitly stated or as contextually understood by one of skill in the art.

FIG. 1A illustrates an example of a diagram of a tunable metasurface 100, according to one embodiment. The tunable metasurface 100 can, for example, be used as part of a solid-state optical transmitter system, receiver system, or transceiver system. As illustrated, the tunable metasurface 100 includes an optical reflector layer 190 and a dielectric layer 195. A plurality of elongated rails 191 are arranged at sub-wavelength intervals on the optical reflector layer 190. The optical reflector layer 190 may be, for example, a layer of copper. The elongated rails 191 may be electrically separated from the optical reflector layer 190 by the dielectric layer 195. The elongated rails 191 may be referred to herein as "resonator rails" because the gaps or channels between adjacent elongated rails 191 are resonant within the optical operational bandwidth of the metasurface.

The elongated rails 191 may be made of metal or have a conductive metal core 150. A passivation layer or passivation coating 160 may be applied to the conductive metal core 150 to passivate the conductive metal core 150. A conductive barrier material 140 may separate a base wall of the metal core of each of the elongated rails 191 from the underlying substrate layers (e.g., the dielectric layer 195). In the illustrated embodiment, each channel has a depth corresponding to the height of the adjacent elongated rails 191. Except for the very thin passivation layer, the depth of each channel is approximately equal to the height of each elongated rail. That is, the base of each channel is approximately co-planar to the surface of the dielectric layer 195, from which the elongated rails extend.

Liquid crystal or another refractive index tunable dielectric material 193 is positioned between the elongated rails 191. A controller or metasurface driver (not illustrated) may apply voltage differential bias patterns to the elongated rails 191 to modify a reflection phase of the resonators. The combination of phase delays imparted from all the elongated rails 191 can be used to generate constructive interference in a target beam steering direction. In some embodiments, electrical leads or control lines from the controller or metasurface driver may pass through vias or gaps in the optical reflector layer 190, through the dielectric layer 195, and make electrical connections with each respective elongated rail 191 or groups of elongated rails 191 via the conductive barrier material 140.

Figure 1B:
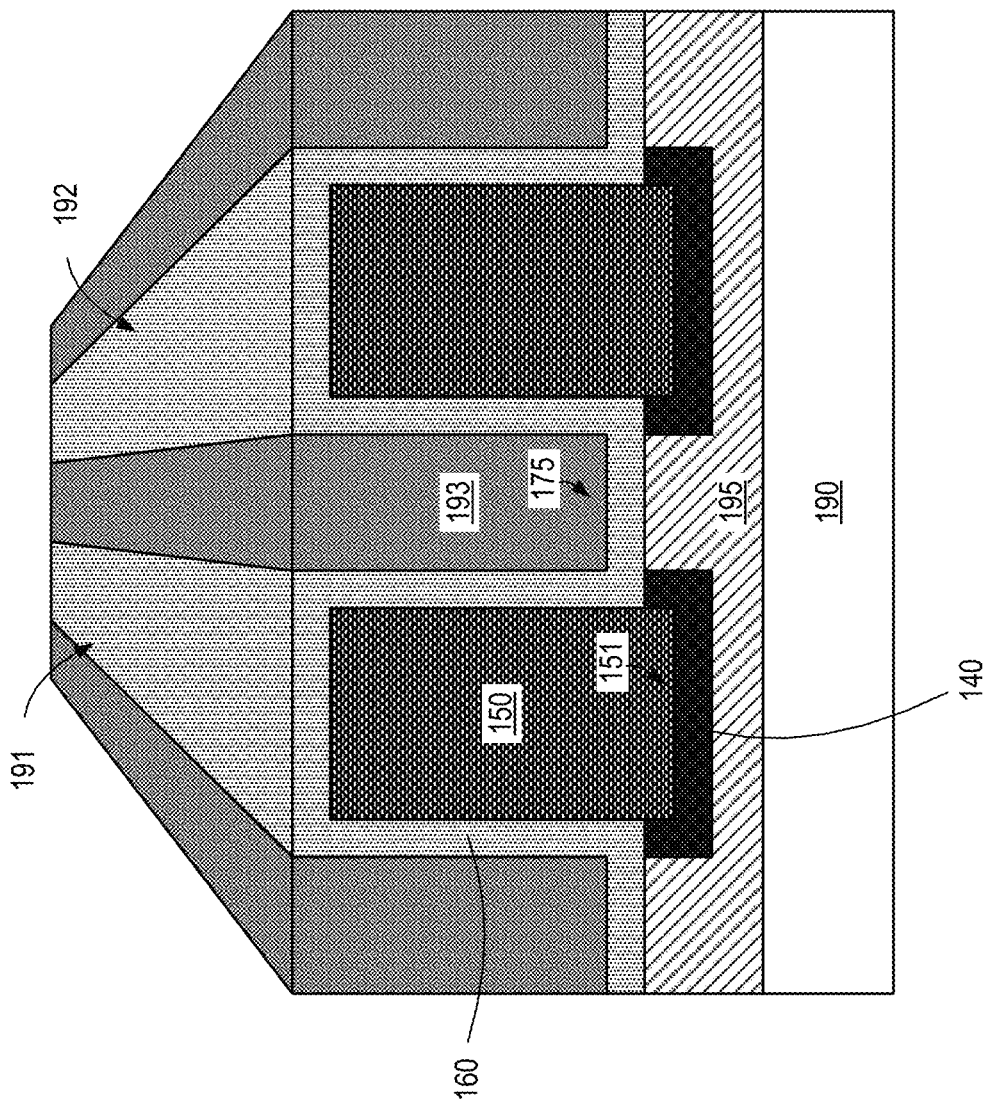
FIG. 1B illustrates an example diagram of liquid crystal positioned between two parallel elongated metal rails of a tunable metasurface, according to one embodiment.

FIG. 1B illustrates an example diagram of the tunable dielectric material 193 (e.g., liquid crystal) positioned within a channel defined between two parallel elongated metal rails 191 and 192, according to one embodiment. As illustrated, the elongated metal rails 191 and 192 extend from the optical reflector layer 190 and are electrically isolated from the optical reflector layer 190 via the dielectric layer 195. The conductive metal core 150 of each metal rail 191 and 192 has a passivation coating 160 applied. Again, the base 175 of each channel is approximately co-planar to the surface of the dielectric layer 195 or upper surface 151 of the conductive barrier 140 from which the elongated rails extend (the proportions of the conductive barrier 140 and thickness of the passivation layer 160 are not drawn to scale or perfectly aligned). In some embodiments, the base 175 of each channel is elevated with respect to the base wall of the elongated metal rails 191 and 192, such that the channel depth is less than the height of the adjacent elongated metal rails.

FIG. 1C illustrates a diagram of a two-dimensional cross-section of liquid crystal 193 positioned within the channel between the two parallel elongated metal rails 191 and 192 of the tunable metasurface, according to one embodiment. The relative dimensions of widths, heights, lengths, and spacing of the elongated metal rails 191 and 192 and the relative thicknesses of the dielectric layer 195 and the optical reflector layer 190 are not necessarily to scale.

As previously described, the base 175 of each channel is approximately co-planar or elevated relative to the surface of the dielectric layer 195 (or conductive barrier layer 140) from which the elongated rails extend. The channel depth is less than the height of the adjacent elongated metal rails in the illustrated example. Given the nanometer-scale of many of the features of the presently described systems and methods, many of the figures, including FIGS. 1A-1C, include features that are not drawn to scale and are not intended to convey information about the actual or relative dimensions of the various elements.

Additional descriptions, variations, functionalities, and usages for optical metasurfaces are described in U.S. Pat. No. 10,451,800 granted on Oct. 22, 2019, entitled "Plasmonic Surface-Scattering Elements and Metasurfaces for Optical Beam Steering;" U.S. Pat. No. 10,665,953 granted on May 26, 2020, entitled "Tunable Liquid Crystal Metasurfaces;" and U.S. Pat. No. 11,092,675 granted on Aug. 17, 2021, entitled "Lidar Systems based on Tunable Optical Metasurfaces," each of which is hereby incorporated by reference in its entirety. Many of the metasurfaces described in the above-identified U.S. patents include parallel rails positioned above a two-dimensional or planar reflective surface or layer.

Figures 2A, 2B, 2C:
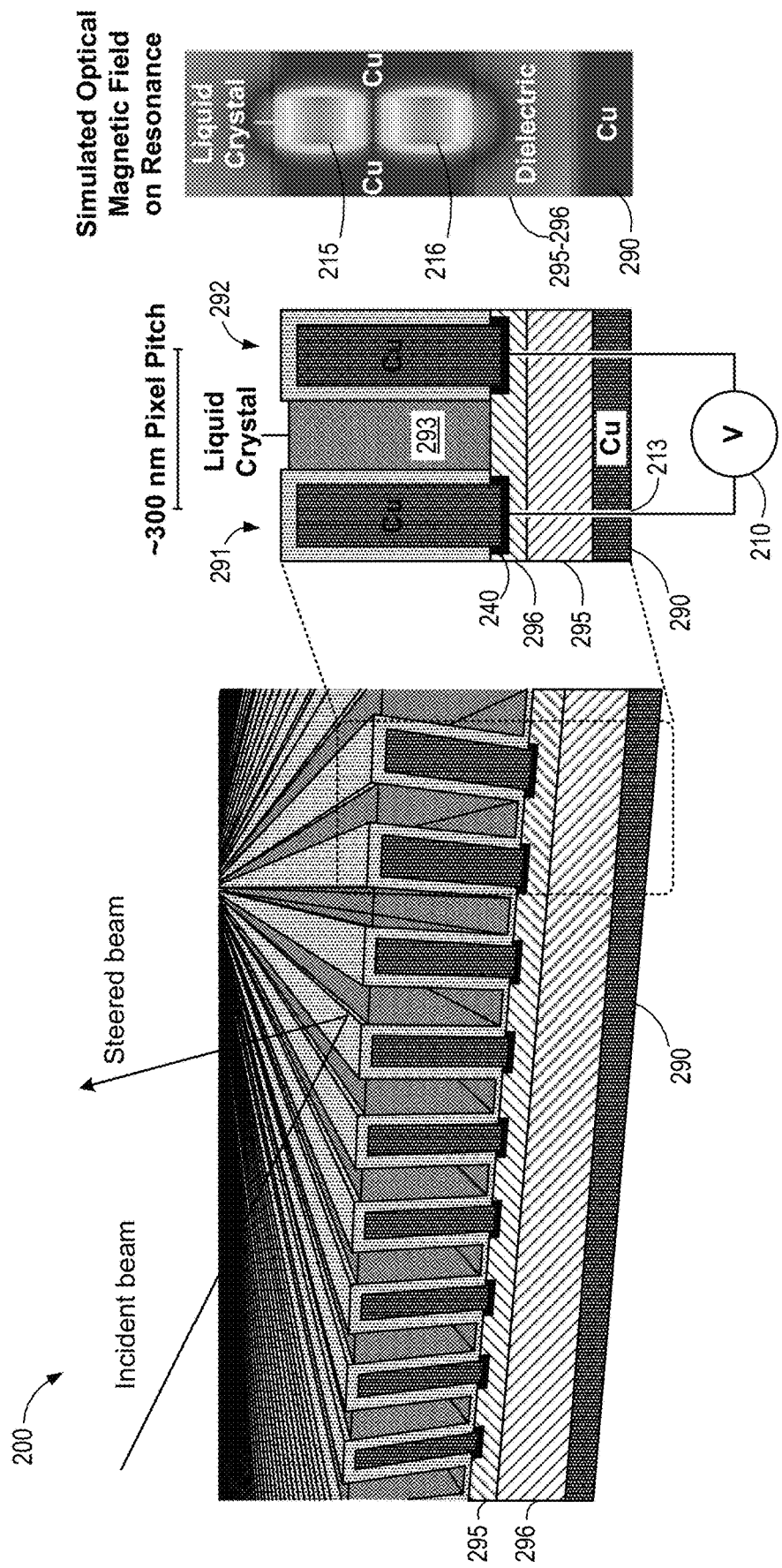
FIG. 2A illustrates a perspective view of elongated metal rails of a liquid crystal metasurface (LCM) extending from a reflective surface, according to one embodiment.
FIG. 2B illustrates an optically reflective copper substrate, insulating layers, metal rails spaced to form channels, and liquid crystal deposited within the channels, according to one embodiment.
FIG. 2C illustrates a simulated optical magnetic field of resonance between two adjacent metal rails, according to one embodiment.

FIG. 2A illustrates a perspective view of elongated metal rails of a liquid crystal metasurface (LCM) 200 extending from a reflective surface 290, according to one embodiment. The reflective surface 290 and the elongated metal rails are insulated from one another by a dielectric via layer 296 and a dielectric etch-stop layer 295.

FIG. 2B illustrates the reflective surface 290 as an optically reflective copper substrate, a dielectric via layer 296, and a dielectric etch-stop layer 295. The elongated metal rails 291 and 292 each extend from a conductive barrier material 240. Liquid crystal 293 is deposited within the channel between the two metal rails 291 and 292. The channel has a standard depth that is equal to or less than the height of the adjacent metal rails 291 and 292.

A voltage controller 210 (such as a metasurface driver) applies a voltage to the two metal rails 291 and 292. Control lines extend from the voltage controller 210 and make an electrical connection with the conductive barrier material 240 after passing through vias 213 in the reflective surface 290, the dielectric etch-stop layer 295, and the dielectric via layer 296. In some embodiments, the control lines may be routed around or through gaps in the reflective surface 290 to avoid having to form insulating vias through a conductive reflective surface 290. The reflection phase associated with the liquid crystal 293 is tunable based on the voltage differential between the elongated metal rails 291 and 292 generated by the voltage controller 210.

FIG. 2C illustrates a simulated optical magnetic field of resonance within the standard-depth channel between the two adjacent metal rails, according to one embodiment. Two resonant nodes 215 and 216 are formed within the optical field region of the channel.

Figure 2D:
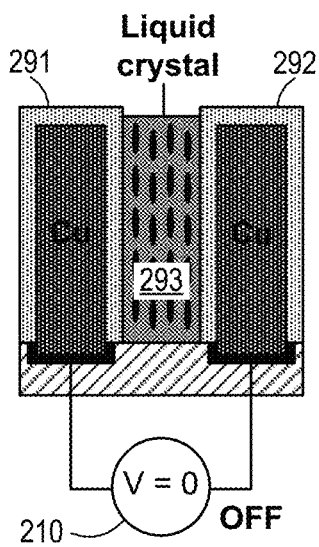
FIG. 2D illustrates liquid crystal between two metal rails aligned in a first direction to provide a first refractive index without any applied voltage, according to one embodiment.

FIG. 2D illustrates liquid crystal 293 within the standard-depth channel (e.g., where the depth of the channel is less than the height of the adjacent rails) between the two elongated metal rails 291 and 292, according to one embodiment. The liquid crystal 293 is aligned in a first direction to provide a first refractive index without any applied voltage (voltage is 0, at 210).

Figure 2E:
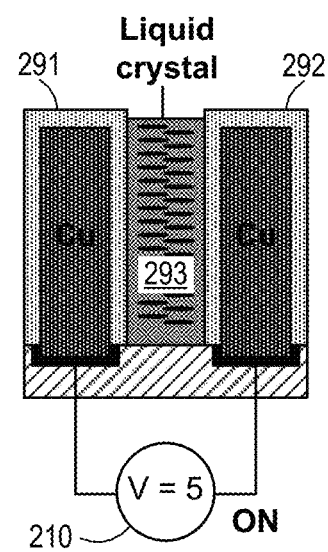
FIG. 2E illustrates the liquid crystal between the two metal rails aligned in a second direction to provide a second refractive index with an applied voltage of 5 volts, according to one embodiment.

FIG. 2E illustrates the liquid crystal 293 in the standard-depth channel between the elongated metal rails 291 and 292 aligned in a second direction to provide a second refractive index with an applied voltage of 5 volts (voltage is 5, at 210).

Figure 2F:
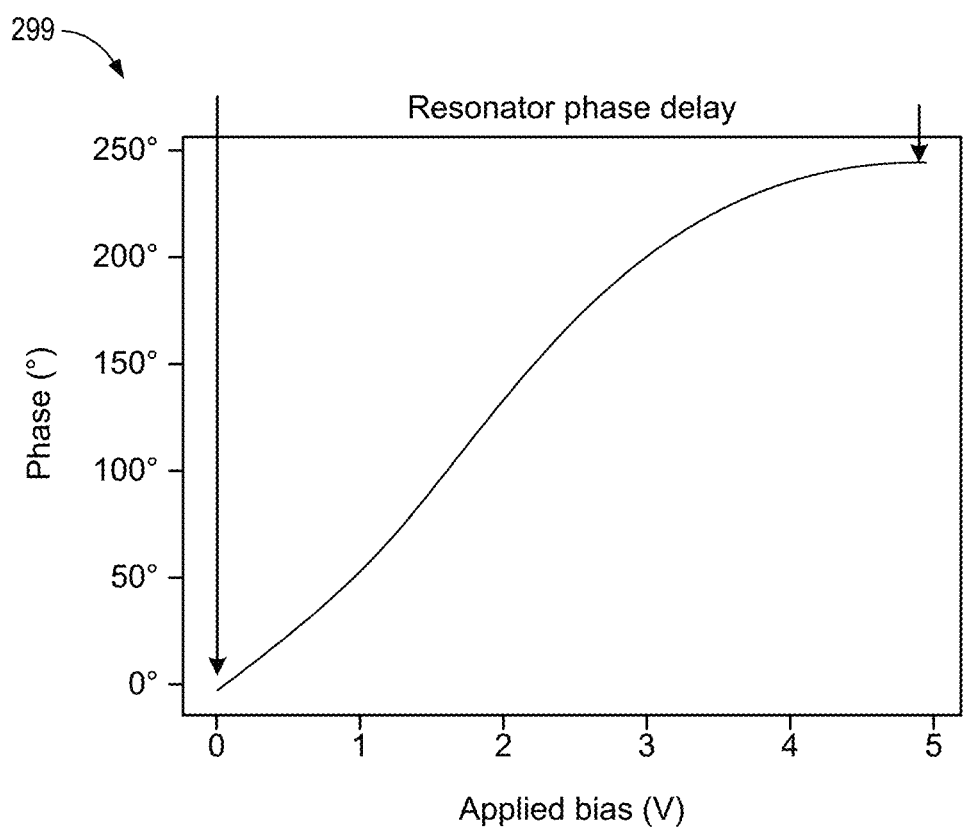
FIG. 2F illustrates a graph of an example phase response of an LCM unit cell with respect to applied voltage values, according to one embodiment.

FIG. 2F illustrates a graph 299 of an example phase response of a metasurface unit cell with respect to applied voltage values, according to one embodiment. As illustrated, various possible phase responses can be obtained by applying a target voltage between 0 and 5 volts. It is appreciated that alternative voltage ranges and/or tunable dielectric materials may be utilized in some applications.

Figure 3A:
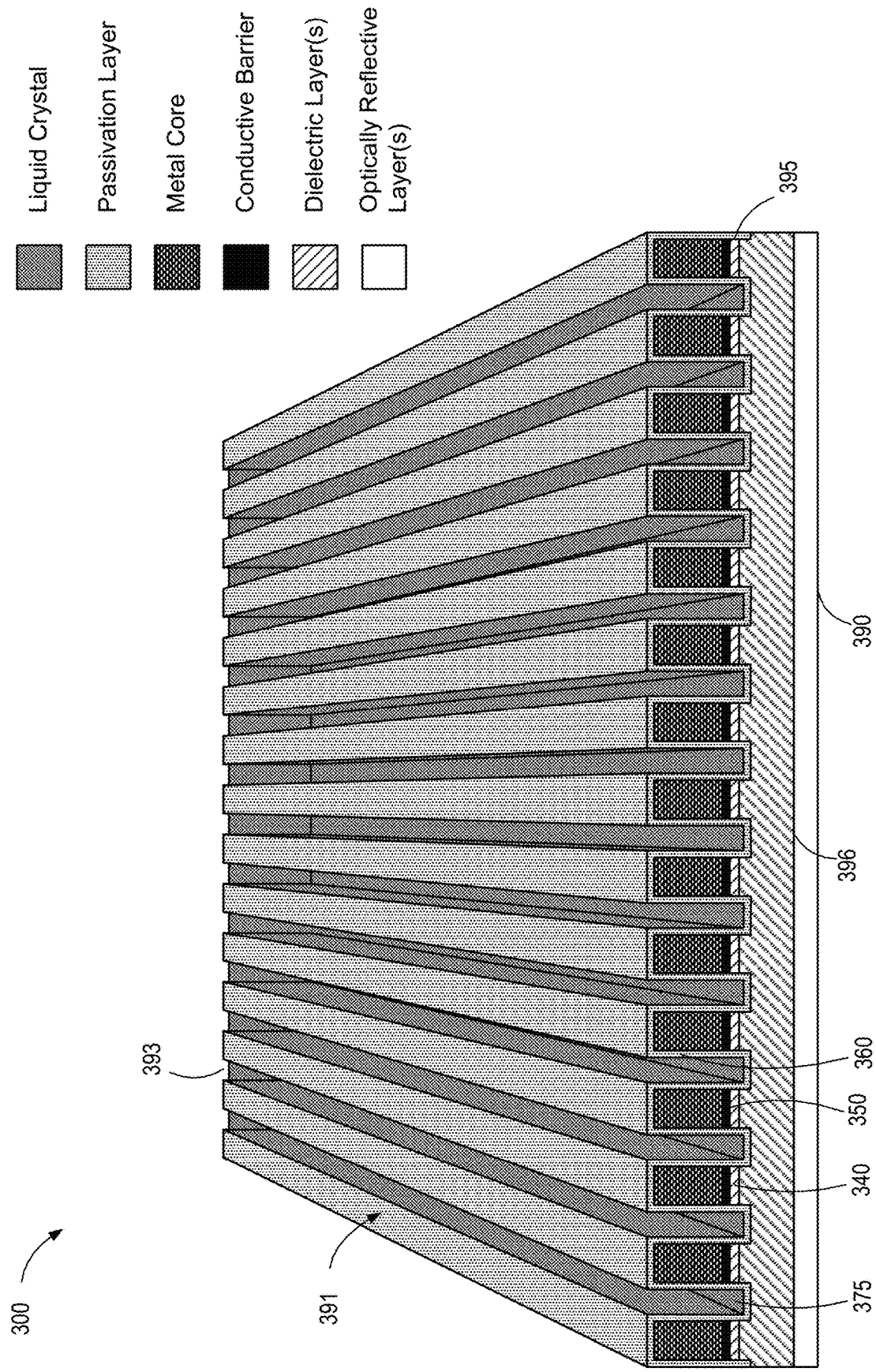
FIG. 3A illustrates an example diagram of a tunable metasurface with extended-depth channels, according to one embodiment.

FIG. 3A illustrates an example diagram of a tunable metasurface 300 with extended-depth channels 375, according to one embodiment. As illustrated, the base of each extended-depth channel 375 is etched through the dielectric etch-stop layer 395 and into the dielectric layer 396. The tunable metasurface 300 includes an optical reflector layer 390 beneath the dielectric layer 396. A plurality of elongated rails 391 are arranged at sub-wavelength intervals and extend from the dielectric layers 395/396 relative to the underlying optical reflector layer 390.

The elongated rails 391 may be made of metal or have a conductive metal core 350. A passivation layer or passivation coating 360 may be applied to the conductive metal core 350 to passivate the conductive metal core 350. A conductive barrier material 340 may separate a base wall of the metal core of each of the elongated rails 391 from the underlying substrate layers (e.g., the dielectric layer 395). As illustrated, each extended-depth channel 375 extends to a depth beyond the base wall of the adjacent elongated rails 391.

Liquid crystal or another refractive index tunable dielectric material 393 is positioned between the elongated rails 391. A controller or metasurface driver (not illustrated) may apply voltage differential bias patterns to the elongated rails 391 to modify a reflection phase of the resonators. The combination of phase delays imparted from all the elongated rails 391 can be used to generate constructive interference in a target beam steering direction. In some embodiments, electrical leads or control lines from the controller or metasurface driver may pass through vias or gaps in the optical reflector layer 390, through the dielectric layers 395/396, and make electrical connections with each respective elongated rail 391 or groups of elongated rails 391 via the conductive barrier material 340.

Figure 3B:
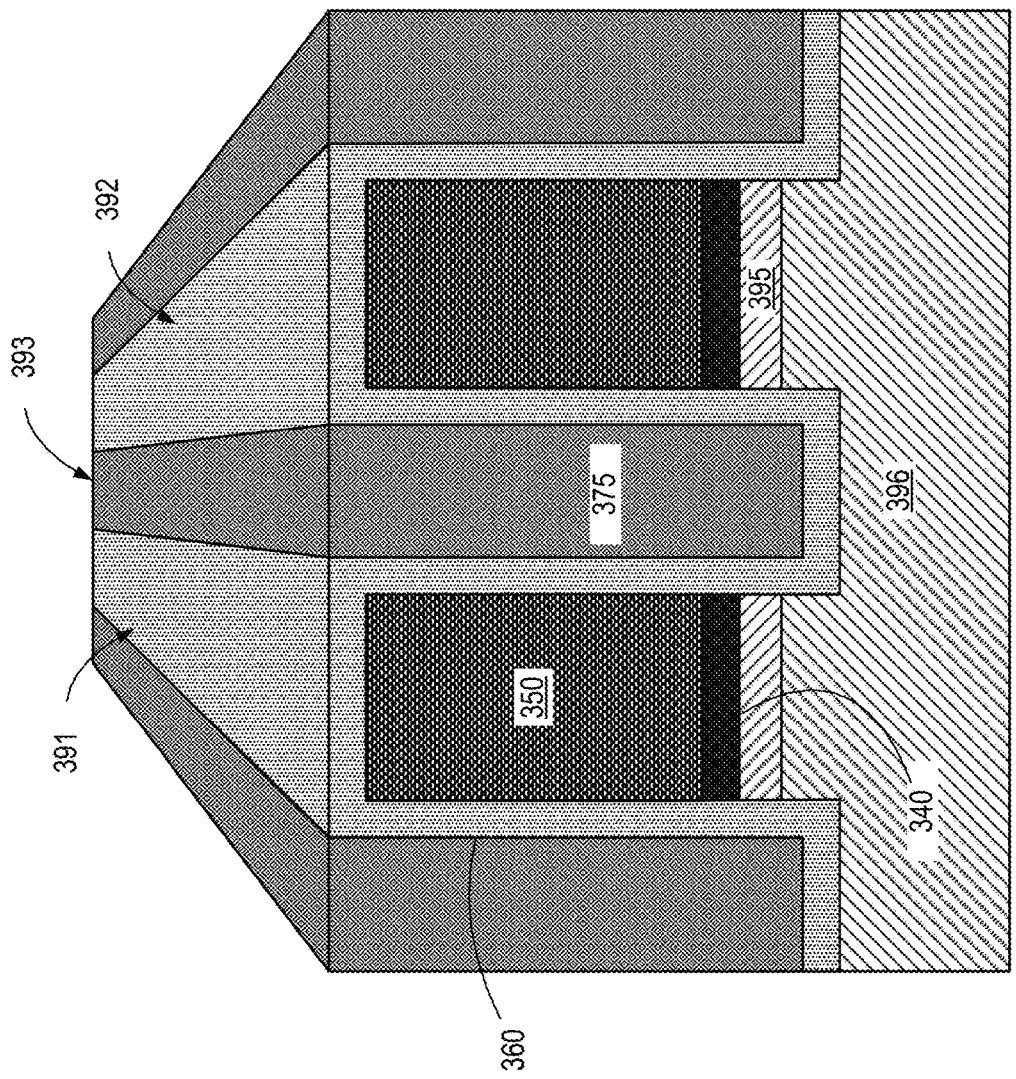
FIG. 3B illustrates an example diagram of liquid crystal positioned within an extended-depth channel between two parallel elongated metal rails of a tunable metasurface, according to one embodiment.

FIG. 3B illustrates an example diagram of liquid crystal 393 positioned within an extended-depth channel 375 between two parallel elongated metal rails 391 and 392 of a tunable metasurface, according to one embodiment. As illustrated, each extended-depth channel 375 extends beyond the base wall of the adjacent elongated rails 391 and 392. Each extended-depth channel 375 extends through the etch-stop dielectric layer 395 and at least partially into the underlying dielectric layer 396.

Figure 3C:
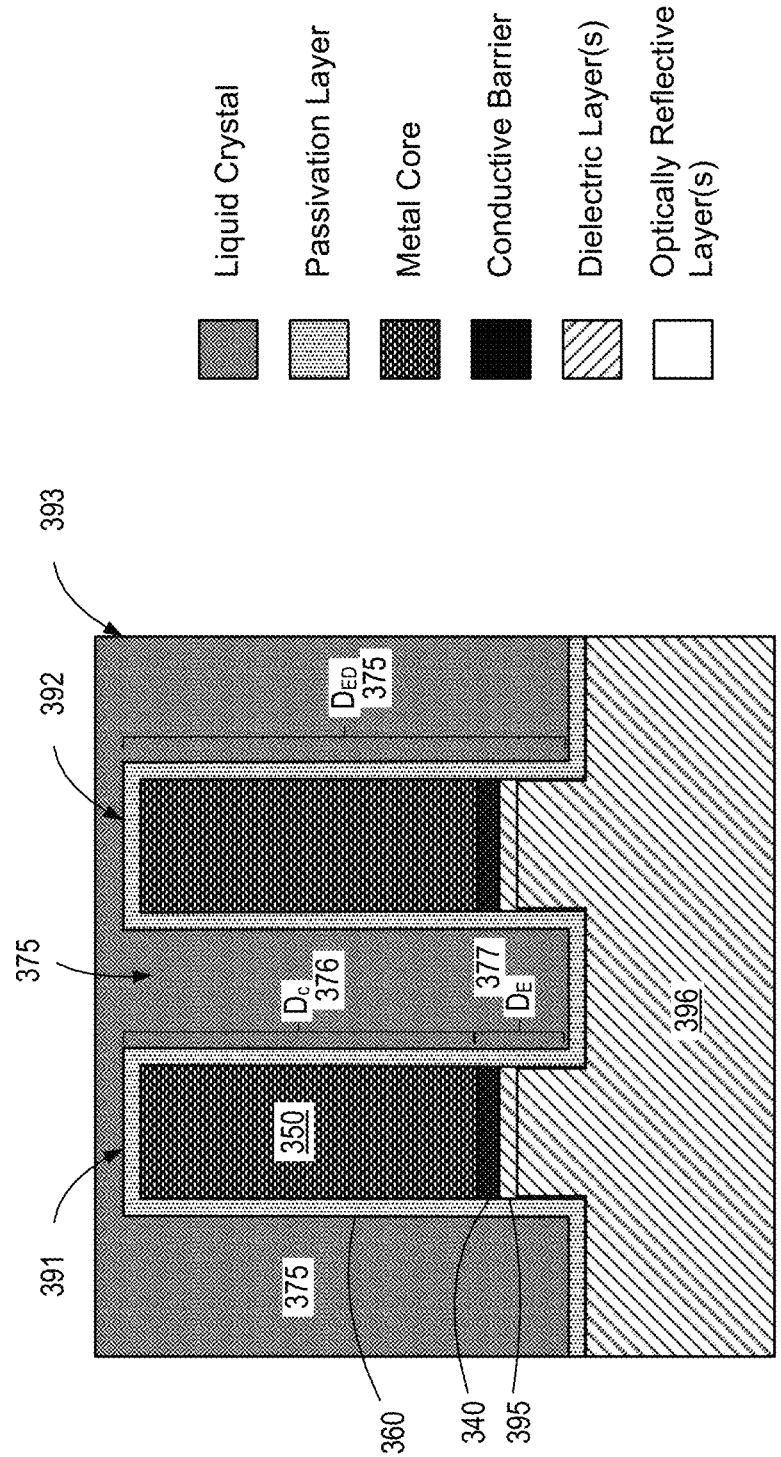
FIG. 3C illustrates a diagram of a two-dimensional cross-section of liquid crystal positioned within an extended-depth channel between two parallel elongated metal rails of a tunable metasurface, according to one embodiment.

FIG. 3C illustrates a diagram of a two-dimensional cross-section of liquid crystal 393 positioned within each of the three illustrated extended-depth channels 375 defined by the two parallel elongated metal rails 391 and 392 of the tunable metasurface, according to one embodiment. As illustrated, each extended-depth channel 375 includes an initial channel portion 376 (e.g., a standard channel) and a channel extension 377. The depth, $D_C$, of the standard channel portion 376 is illustrated as extending from the top wall of the elongated metal rail 391 down to approximately the upper surface of the conductive barrier 340. The depth, $D_E$, of the channel extension is represented as the distance between the upper surface of the conductive barrier 340 and the bottom of the channel 375 within the dielectric layer 396. Accordingly, the extended-depth channel 375 has a depth, $D_{ED}$, that extends from the upper wall of the elongated metal rail 392 through the etch-stop dielectric layer 395 to the bottom of the channel 375 within the dielectric layer 396.

FIGS. 4A-4F illustrate example diagrams of a manufacturing process for forming the metal rails of a metasurface, according to one embodiment. In many embodiments, an optical reflector layer may be utilized for reflective-type metasurfaces. The optical reflector layer is omitted from the illustrated diagrams, as are other possible underlying layers outside of the scope of this disclosure. A similar configuration without an optical reflector layer may be used for transmissive or transmit-type metasurfaces.

Figure 4C:
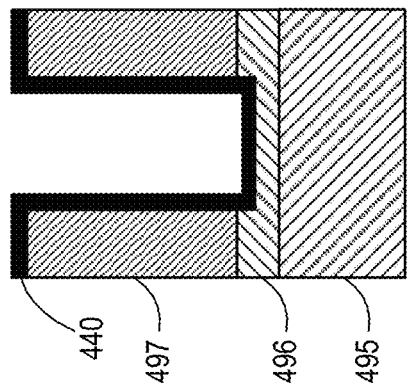
FIGS. 4A-4F illustrate example diagrams of a manufacturing process for forming the metal rails of a metasurface, according to one embodiment.
Figure 4B:
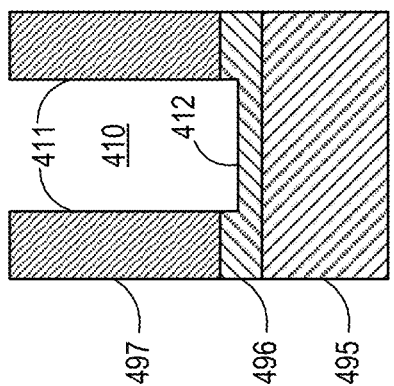
Figure 4A:
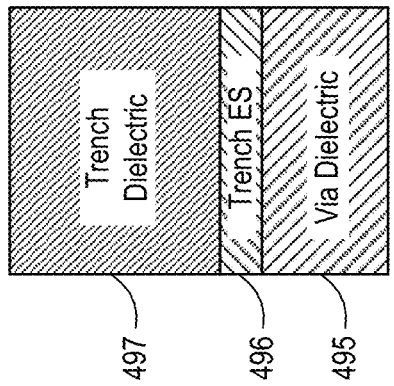

FIG. 4A illustrates a dielectric via layer 495, a dielectric etch-stop layer 496, and a dielectric trench layer 497, which can be collectively referred to as a dielectric substrate. In some embodiments, the dielectric via layer 495, the dielectric etch-stop layer 496, and the dielectric trench layer 497 are the same material and/or even the same deposition layer. In such embodiments, the dielectric etch-stop layer 496 is merely conceptual and/or useful in discussing the depth to which a trench is etched within the dielectric substrate. In other embodiments, the dielectric etch-stop layer 496 is a different material than the dielectric trench layer 497. An etching process may be utilized that is capable of etching the dielectric trench layer 497 but unable to etch (or more slowly etch) the dielectric etch-stop layer 496. In such embodiments, the dielectric etch-stop layer 496 functions to limit or control the depth to which a trench is etched within the dielectric substrate.

For example, the dielectric via layer 495 and the dielectric trench layer 497 may comprise silicon (Si). The dielectric etch-stop layer 496 may comprise a silicon oxide layer that is resistive to some etching processes and/or etching solutions. Any of the wide variety of etch-stop layer deposition and etching approaches known in the industry may be utilized to form trenches in the dielectric trench layer 497, including maskless lithography using silicon oxide etch-stop layers induced by laser pulses.

FIG. 4B illustrates a trench 410 etched in the dielectric trench layer 497 that stops at or slightly within the dielectric etch-stop layer 496. A method to manufacture a tunable optical device may include etching the dielectric trench layer 497 to form an array of parallel elongated trenches in a dielectric substrate. Each elongated trench 410 may have substantially vertical sidewalls 411 (as illustrated) separated by a base wall 412 that has a width less than a wavelength within the operational bandwidth of the tunable optical device (e.g., metasurface). In subsequent figures, the sidewalls 411 and base wall 412 of the trench 410 are not labeled to avoid obscuring other aspects of the figures.

Etching the trench 410 may be implemented using any of a wide variety of lithography and etching technologies and approaches. Examples of suitable approaches for etching the trench 410 include but are not limited to nanolithography, photoresist patterning, reactive ion etching (RIE), wet chemical etching, ion beam etching (IBE), reactive ion beam etching (RIBE), ion beam milling (IBM), and the like.

FIG. 4C illustrates a conductive barrier material 440 deposited on the base wall 412 of the trench 410. In the illustrated embodiment, the conductive barrier material 440 is deposited as a conformal layer on the base wall 412 and sidewalls 411 of the trench 410 as well outside of the trench on the upper surfaces of the dielectric trench layer 497. Any of a wide variety of thin-film or layer deposition processes may be utilized to deposit the conductive barrier material 440, including but not limited to atomic layer deposition (ALD), chemical vapor deposition (CVD), electroless deposition (ELD), sputtering, evaporation deposition, and the like. In some embodiments, selective deposition techniques may be utilized to limit the deposition of the conductive barrier material 440 to only cover the base wall 412 of the trench 410. According to various embodiments, the conductive barrier material 440 may be tantalum and/or a tantalum nitride.

Figure 4F:
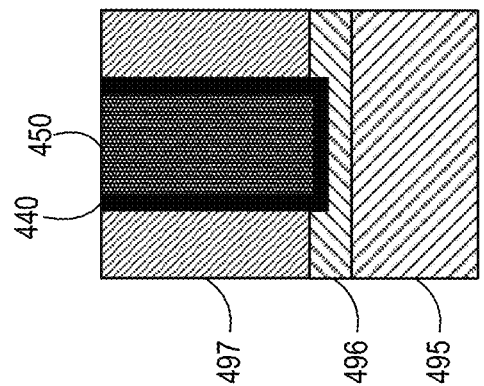
Figure 4E:
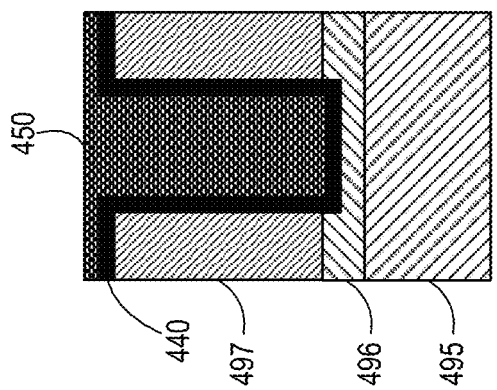
Figure 4D:
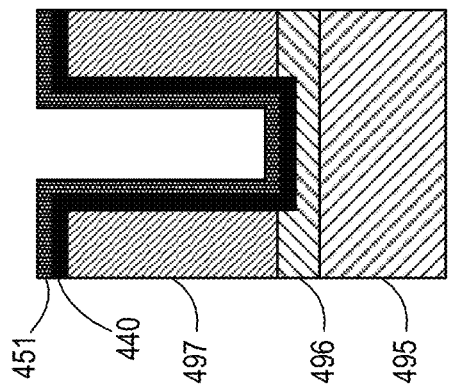

FIG. 4D illustrates a conductive metal seed 451 deposition within the trench 410. In various embodiments, the conductive metal seed 451 is copper or a copper alloy. In alternative embodiments, the conductive metal seed 451 may comprise one or more of, or a combination of, copper, aluminum, and tungsten. In some embodiments, the conductive metal seed 451 may be deposited using a chemical vapor deposition process, a sputtering process, or another thin-film deposition process. In some embodiments, selective deposition techniques may be utilized to limit the deposition of the conductive metal seed 451 to only cover the sidewalls 411 and/or base wall 412 of the trench 410.

FIG. 4E illustrates the trench 410 filled with a conductive metal 450 (e.g., copper). According to various embodiments, the trench 410 may be filled with the conductive metal 450 via electrochemical plating (ECP) using the conductive metal seed 451 as the "seed" for the electrochemical plating process.

FIG. 4F illustrates the conductive metal 350 and the conductive barrier material 340 within the trench. The upper surfaces outside of the trench 410 have been removed by, for example, chemical mechanical planarization (CMP). In alternative embodiments, any of a wide variety of chemical or mechanical removal processes may be utilized. Chemical mechanical planarization (CMP) may be used to achieve a target height of the conductive metal 450 that will ultimately correspond to the height of the elongated metal rails.

FIGS. 5A-5E illustrated example diagrams of a manufacturing process for forming extended-depth channels filled with a tunable dielectric material between elongated metal rails, according to one embodiment.

Figure 5C:
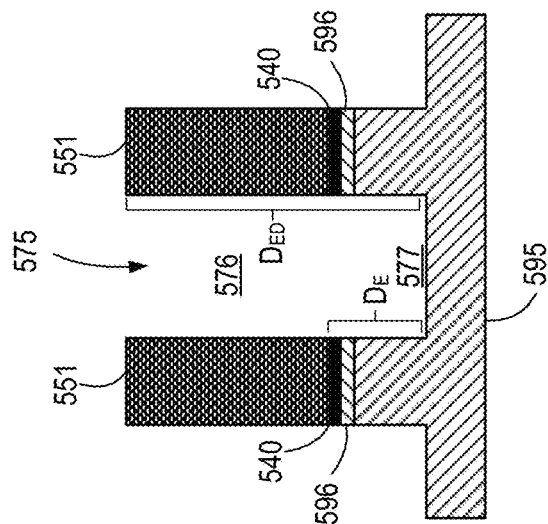
FIGS. 5A-5E illustrated example diagrams of a manufacturing process for forming extended-depth channels filled with a tunable dielectric material between the metal rails, according to one embodiment.
Figure 5B:
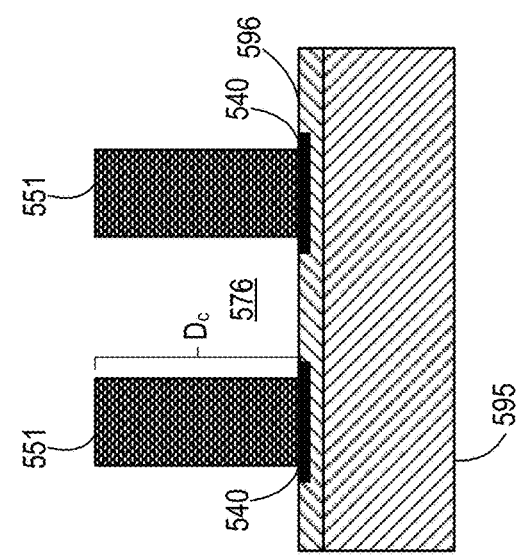
Figure 5A:
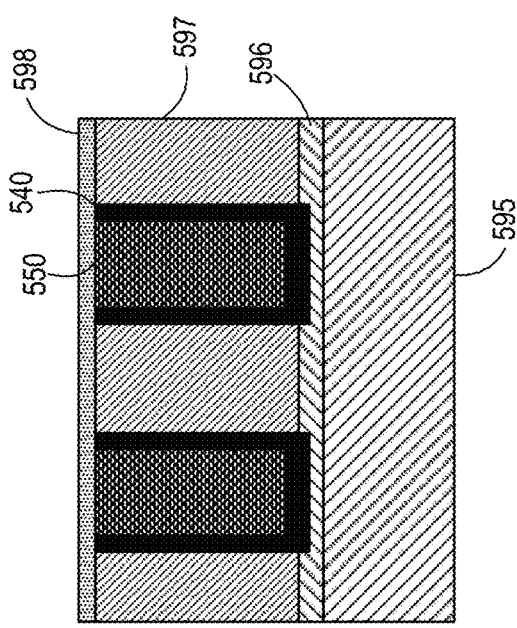

FIG. 5A illustrates begins at a stage similar to that illustrated in FIG. 4F in which the conductive metal 550 is deposited within trenches and separated from the surrounding dielectric trench layer 597 and the dielectric etch-stop layer 596 by a conductive barrier material 540. An additional etch-stop layer 598 (e.g., SiN) may be present as a layer above the conductive metal 550 as well.

FIG. 5B illustrates the material on either side of the conductive metal 550 removed, including the dielectric trench layer 597 and the conductive barrier material 540 on the sidewalls (see 411 of FIG. 4F) of the trench (see 410 of FIG. 4F). As illustrated, with the material between adjacent elongated trenches removed, the conductive metal 550 is exposed as parallel elongated metal rails 551. The illustration shows only two elongated metal rails 551 extending from the conductive barrier material 540 on the dielectric etch-stop layer 596. However, the many conductive metal 550 cores may be exposed by removing the lateral material between many parallel elongated trenches in an array of parallel elongated trenches. Accordingly, an array of any number of parallel elongated metal rails 551 of the conductive metal 550 may be exposed to define channels therebetween.

Each elongated metal rail 551 includes opposing sidewalls, a top wall, and a base wall. The base wall of the elongated metal rail 551 is separated from the dielectric etch-stop layer 596 by the remaining region (patch or layer) of the conductive barrier material 540. The standard-depth channel 576 between the elongated metal rails 551 has a depth, $D_C$, that is approximately equal to the height of the adjacent elongated metal rails. The standard-depth channel 576 does not penetrate or at least does not fully penetrate the dielectric etch-stop layer 596.

FIG. 5C illustrates a channel extension 577 formed in the dielectric substrate. The channel extension 577 is formed directly beneath and aligned with standard-depth channel 576 to form an extended-depth channel 575. The channel extension 577 extends through the dielectric etch-stop layer 596 and into the underlying dielectric layer 595. The depth, $D_E$, of the channel extension is defined between the upper surface of the conductive barrier material 540 and the bottom wall of the extended-depth channel 575 within the underlying dielectric layer 595. The total depth, $D_{ED}$, of the extended-depth channel 575 is equal to the depth, $D_E$, of the channel extension plus the depth, $D_C$, of the standard-depth channel 576. In the illustrated embodiment, the channel extension has a depth, $D_E$, that is approximately 50% of the depth, $D_C$, of the standard-depth channel 576. In various embodiments, the depth, $D_E$, of the channel extension may be deeper or shallower relative to the depth, $D_C$, of the standard-depth channel 576.

Figure 5E:
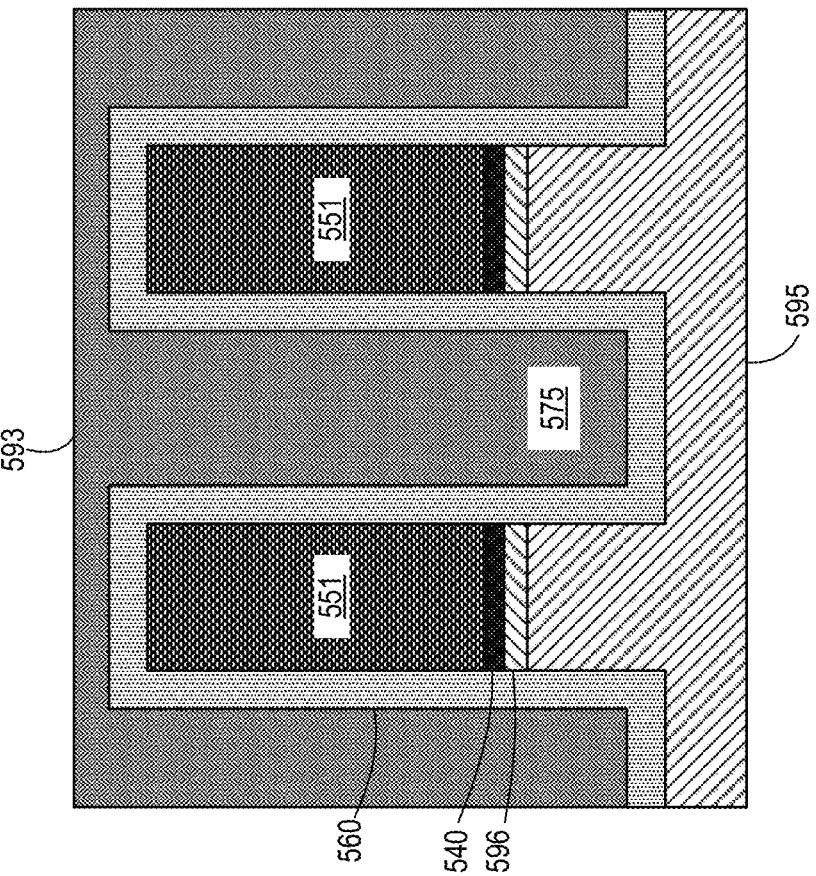
Figure 5D:
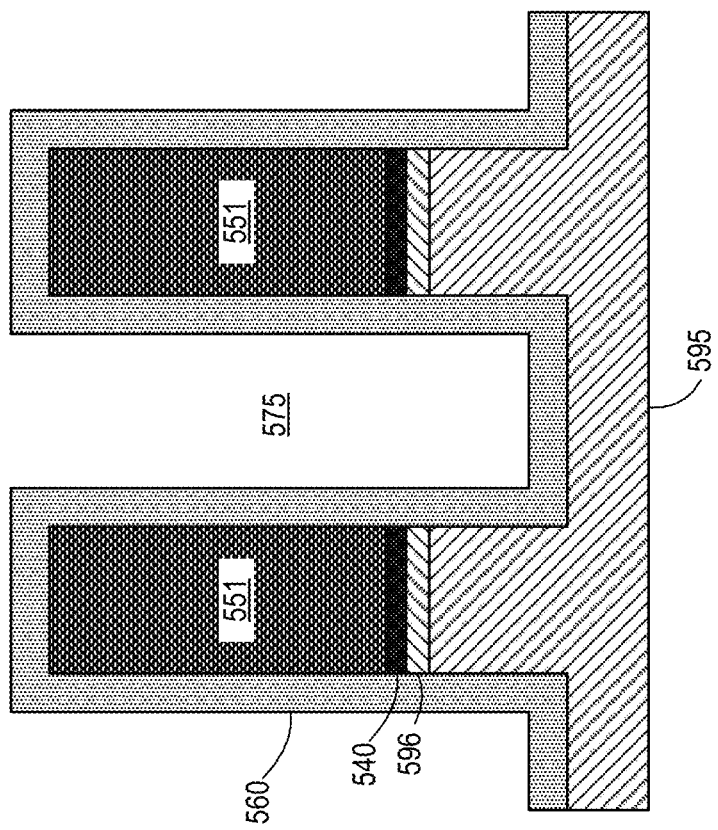

FIG. 5D illustrates a passivation coating 560 (e.g., passivation layer) applied to each of the elongated metal rails 551. The passivation coating 560 operates to passivate the exposed metal of the elongated metal rails 551. The passivation coating 560 may be, for example, a thin film or layer of silicon nitride. The passivation coating 560 may be applied using any of the various deposition techniques described herein. In some embodiments, the passivation coating 560 may be applied as a uniform or conformal layer over the elongated metal rails 551 and within the extended-depth channels, including along a bottom wall of the extended-depth channel 575.

FIG. 5E illustrates the extended-depth channels 575 filled with a tunable dielectric material 593 that has a tunable refractive index, including the extended-depth channels to the left and right of the center extended-depth channel 575 between the adjacent elongated metal rails 551. For example, liquid crystal or another of the materials described herein may be positioned within the channels of the array of elongated metal rails 551. The index of refraction of the tunable dielectric material 593 may be dynamically modified based on a voltage differential applied to the elongated metal rails 551 on either side of each respective channel of each respective pair of elongated metal rails 551 in a one-dimensional array on any number of elongated metal rails.

Figures 6A, 6B, 6C:
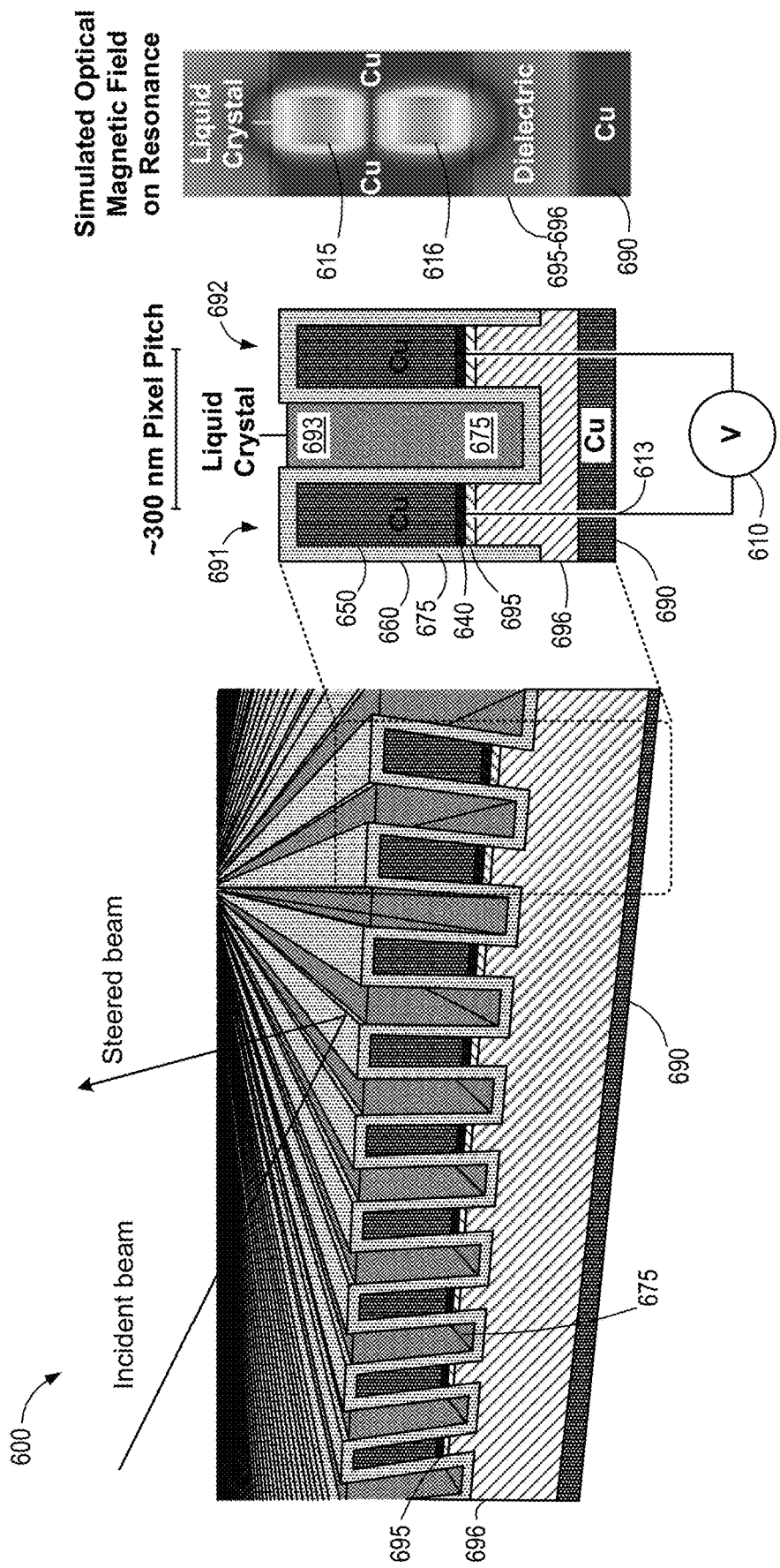
FIG. 6A illustrates a perspective view of elongated metal rails of a liquid crystal metasurface (LCM) within an extended-depth channel therebetween, according to one embodiment.
FIG. 6B illustrates an optically reflective copper substrate, insulating layers, metal rails, and an extended-depth channel filled with liquid crystal, according to one embodiment.
FIG. 6C illustrates a simulated optical magnetic field of resonance within an extended-depth channel between two adjacent metal rails, according to one embodiment.

FIG. 6A illustrates a perspective view of extended-depth channels 675 between elongated metal rails and of a liquid crystal metasurface (LCM) 600 extending from a reflective surface 690, according to one embodiment. The reflective surface 690 and the elongated metal rails are insulated from one another by a dielectric via layer 696 and a dielectric etch-stop layer 695.

FIG. 6B illustrates the reflective surface 690 as an optically reflective copper substrate, an insulating dielectric via layer 696, and an insulating dielectric etch-stop layer 695. The elongated metal rails 691 and 692 each extend from a conductive barrier material 640. Liquid crystal 693 is deposited within the extended-depth channel 675 between the two metal rails 691 and 692. Each of the elongated metal rails 691 and 692 comprises a conductive metal core 650 made of copper. The copper conductive metal core 650 of each metal rail 691 and 692 includes a passivation coating 660 of silicon nitride.

A voltage controller 610 (such as a metasurface driver) applies a voltage to the two metal rails 691 and 692. Control lines extend from the voltage controller 610 and make an electrical connection with the conductive barrier material 640 after passing through vias 613 in the reflective surface 690, the dielectric layer 695, and the dielectric etch-stop layer 696. In some embodiments, the control lines may be routed around or through gaps in the reflective surface 690 to avoid having to form insulating vias through a conductive reflective surface 690. The reflection phase associated with the liquid crystal 693 is tunable based on the voltage differential between the elongated metal rails 691 and 692 generated by the voltage controller 610.

FIG. 6C illustrates a simulated optical magnetic field of resonance within the extended-depth channel 675 between two adjacent metal rails, according to one embodiment. Two resonant nodes 615 and 616 are formed within the optical field region in the extended-depth channel 675 between the elongated metal rails 691 and 692.

Figure 6D:
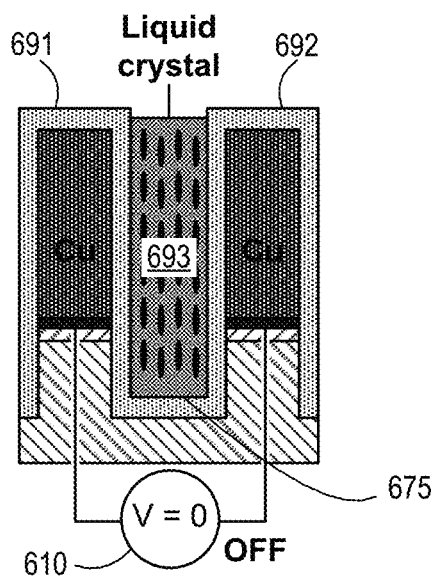
FIG. 6D illustrates liquid crystal within an extended-depth channel aligned in a first direction to provide a first refractive index without any applied voltage, according to one embodiment.

FIG. 6D illustrates liquid crystal 693 within the extended-depth channel 675 between the two elongated metal rails 691 and 692, according to one embodiment. The liquid crystal 693 is aligned in a first direction to provide a first refractive index without any applied voltage (voltage is 0, at 210).

Figure 6E:
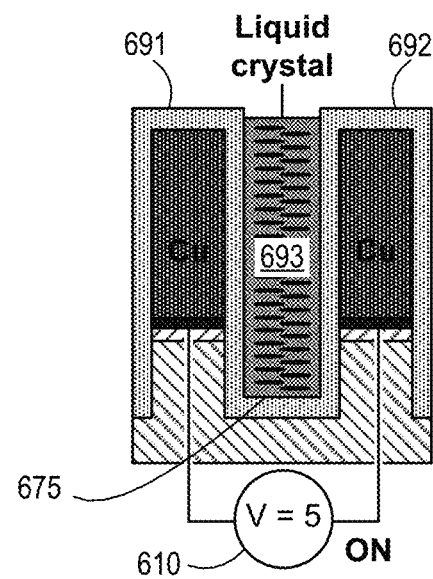
FIG. 6E illustrates the liquid crystal within the extended-depth channel aligned in a second direction to provide a second refractive index with an applied voltage of 5 volts, according to one embodiment.

FIG. 6E illustrates the liquid crystal 693 in the extended-depth channel 675 between the elongated metal rails 691 and 692 aligned in a second direction to provide a second refractive index with an applied voltage of 5 volts (voltage is 5, at 210).

Figure 6F:
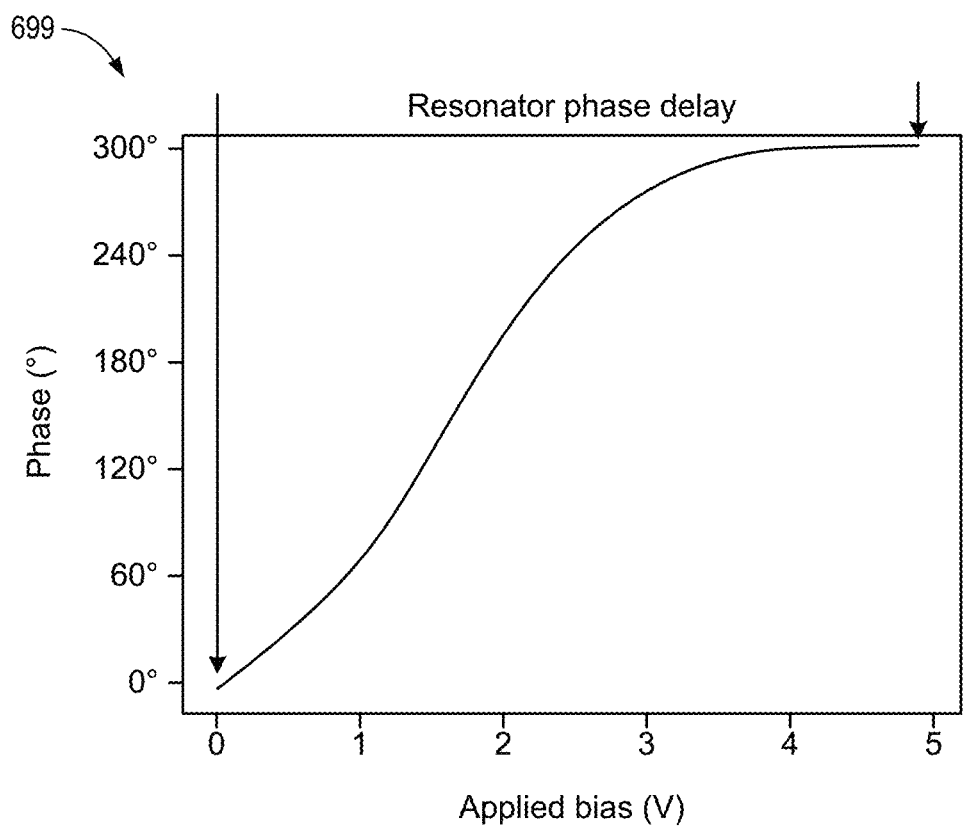
FIG. 6F illustrates a graph of an example phase response with respect to applied voltage values of an LCM unit cell with an extended-depth channel, according to one embodiment.

FIG. 6F illustrates a graph 699 of an example phase response of a metasurface unit cell with extended-depth channels with respect to applied voltage values, according to one embodiment. As illustrated, various possible phase responses can be obtained by applying a target voltage between 0 and 5 volts. It is appreciated that alternative voltage ranges and/or tunable dielectric materials may be utilized in some applications. The extend-depth channels 675 include more liquid crystal through which the optical radiation passes. A comparison of the graph 699 in FIG. 6F with the graph 299 of FIG. 2F reveals that the extended-depth channels 675 result in an extended phase response from zero degrees up to three hundred degrees. The exact phase response depends on the specific liquid crystal utilized and/or the use of another tunable dielectric material that has a tunable refractive index. A significant difference between FIG. 2F and FIG. 6F is that the extended-depth channels 675 provide a greater phase change for a given applied voltage and given tunable dielectric material. In some embodiments, the extended-depth channels 675 may also result in a more uniform phase delay of optical radiation passing therethrough, affect a wider range of optical frequencies, and/or result in other optical phase and amplitude control refinements.

FIG. 7A illustrates a diagram 700 of simulated electric field values within a standard-depth channel between two metal pillars or rails (e.g., where the depth of the standard-depth channel is approximately equal to adjacent pillars or rails), according to one embodiment. As illustrated, the base 710 of the liquid crystal within the channel is positioned at the beginning of a positive voltage field node. However, most of the positive voltage field node is within the dielectric material below the base 710 of the liquid crystal.

FIG. 7B illustrates a diagram 750 of simulated electric field values within an extended-depth channel 775 between two metal pillars or rails, according to one embodiment. As illustrated, the electric field extends into the channel extension portion of the extended-depth channel 775, which is filled with liquid crystal or another tunable refractive index material. Accordingly, the extended-depth channel 775 utilizes a larger portion of the electric field to control the tunable refractive index, which, as described in conjunction with FIG. 6F results in an increased phase tuning range for a given applied voltage range and given tunable refractive index material.

FIGS. 8A-8D illustrate a simplified embodiment of an optical surface scattering device with a two-dimensional array of metal pillars, according to one embodiment. Any of the various embodiments and variations described in the context of a one-dimensional array of metal rails may be adapted and utilized in conjunction with a two-dimensional array of elongated metal rails, rectangular metal rails, square metal pillars, rectangular metal pillars, and/or a two-dimensional array of metal pillars having alternative shapes such as various polygonal shapes, ovals, or circles.

Figure 8A:
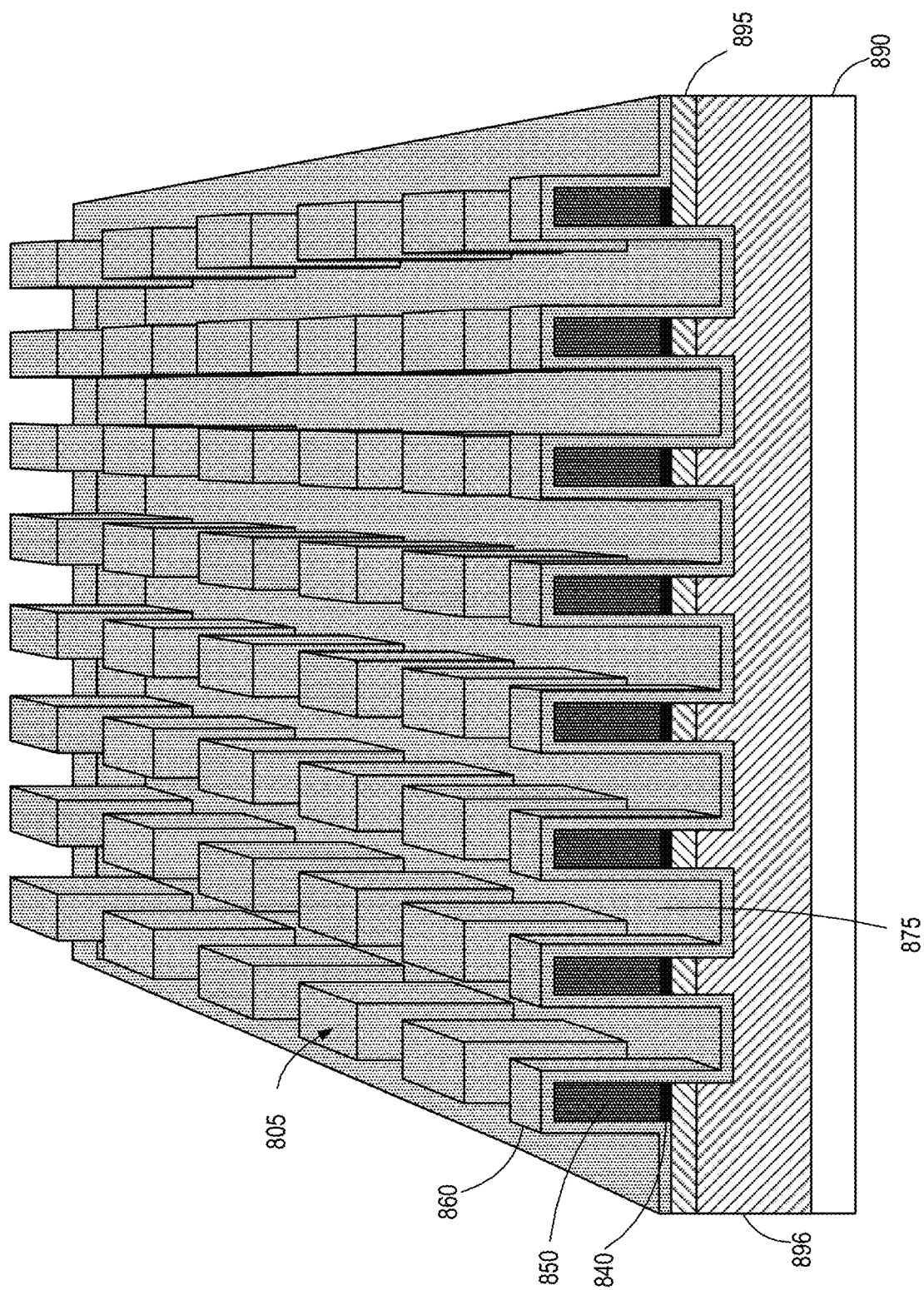
FIGS. 8A-8D illustrate a simplified embodiment of an optical surface scattering device with a two-dimensional array of metal pillars, according to one embodiment.

FIG. 8A illustrates a simplified perspective view of a two-dimensional array of rectangular metal pillars 805 extending from a substrate. The illustrated embodiment includes a cutaway view of the first row of rectangular metal pillars 805 to show the internal layers and elements. As with other embodiments, the illustration is simplified to show a limited number of elements in a block diagram format. In various embodiments, the number of rectangular metal pillars 805 may be in the thousands, tens of thousands, hundreds of thousands, or even millions, depending on the size of the die and the size of the individual metal pillars. Moreover, the exact dimensions and shapes may be approximated and vary based on the manufacturing techniques utilized and the associated limitations thereof.

As illustrated, the conductive metal core 850 of each rectangular metal pillar 805 has a passivation coating 860 that coats the top wall and four sidewalls of each conductive metal core 850. The passivation coating extends across the surface between the rectangular metal pillars as well, said surface being the base wall of the extended-depth gaps or channels 875 in the two-dimensional array. Extended-depth gaps 875 exist between any two adjacent rectangular metal pillars 805, such that some rectangular metal pillars 805 have four nearest-neighbor rectangular metal pillars 805. The two-dimensional array of extended-depth channels 875 results in the removal of the dielectric etch-stop layer 895 and some of the dielectric layer 896 from everywhere except the edges of the two-dimensional array. In some embodiments, the outer edges of the dielectric etch-stop layer 895 and the dielectric layer 896 of the two-dimensional array may also be etched away such that the rectangular metal pillars 805 extend from a planar surface.

An optical reflector layer 890 is positioned beneath the dielectric layer 896. The rectangular metal pillars 805 are arranged at sub-wavelength intervals in both directions to form the two-dimensional array. A conductive barrier material 840 separates the base wall of the conductive metal core 850 of each rectangular metal pillar 805 from the underlying substrate layers (e.g., the dielectric layer 895 and the etch-stop layer 896). As illustrated, the extended-depth gaps or channels 875 combine to lower the planar level from which the rectangular metal pillars 805 extend to a point within the dielectric layer 896. Notably, the planar level of the dielectric layer 896 between adjacent rectangular metal pillars 805 (that forms the base wall of the extended-depth gaps or channels 875 in the two-dimensional array) is lower than the planar level of the dielectric layer 896 and the conductive barrier material 840 within each rectangular metal pillar 805.

Figure 8B:
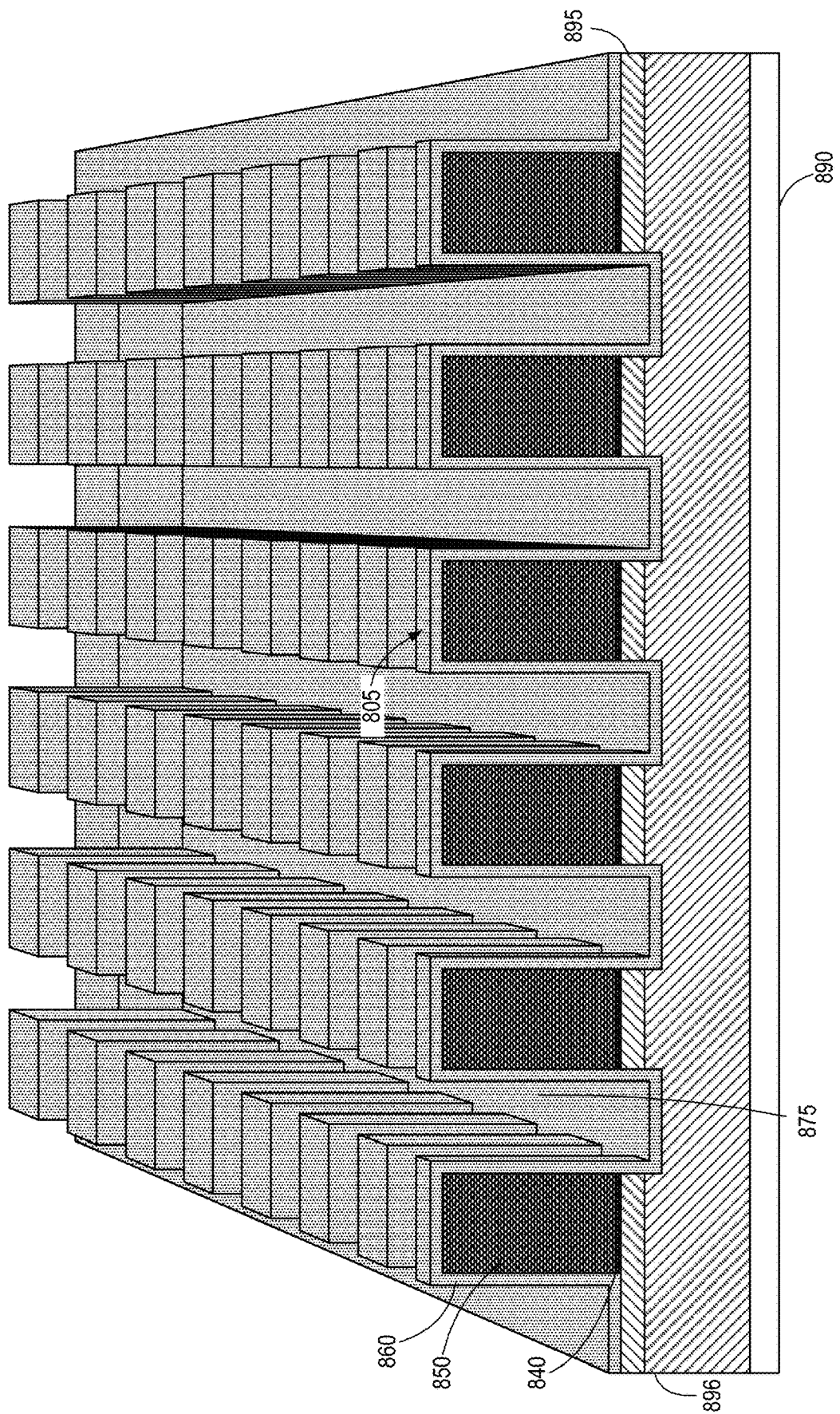

FIG. 8B illustrates a side perspective view of the same metasurface illustrated in FIG. 8A. To provide some context for understanding the special relationship between FIGS. 8A and 8B, the label "805" is applied to the same rectangular metal pillar 805 in each of the two-dimensional arrays. Again, each rectangular metal pillar 805 has a passivation coating 860 that coats the top wall and four sidewalls of each conductive metal core 850. A conductive barrier material 840 separates the base wall of the conductive metal core 850 of each rectangular metal pillar 805 from the underlying substrate layers 895 and 896.

Figure 8C:
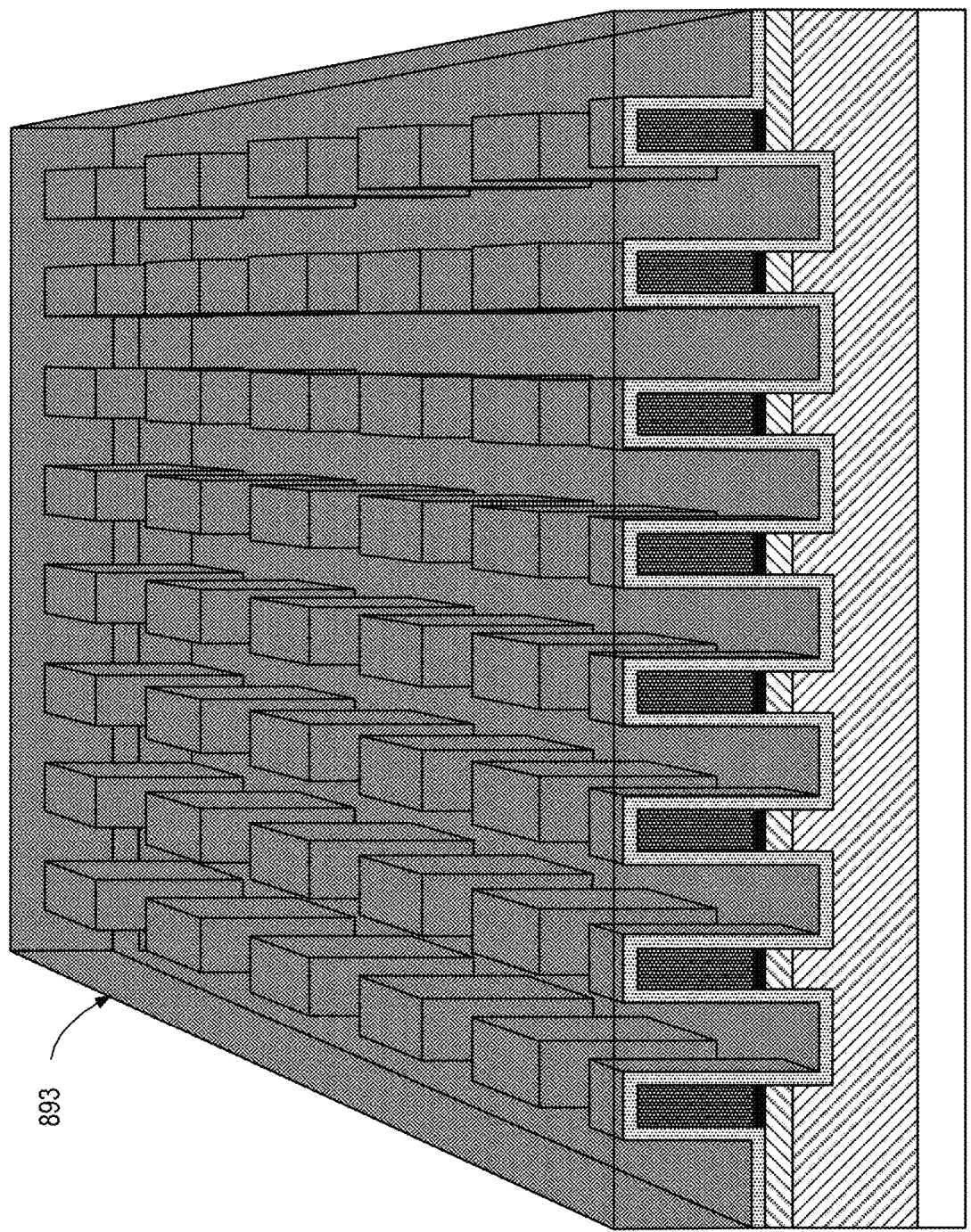

FIG. 8C illustrates liquid crystal or another refractive index tunable dielectric material 893 positioned to fill the extended-depth gaps or channels between the rectangular metal pillars 805. FIG. 8C is from the same perspective as FIG. 8A. A controller or metasurface driver (not illustrated) may apply voltage differential bias patterns to the two-dimensional array of rectangular metal pillars 805 to modify a reflection phase of the resonators for two-dimensional beam steering and/or beam shaping.

Figure 8D:
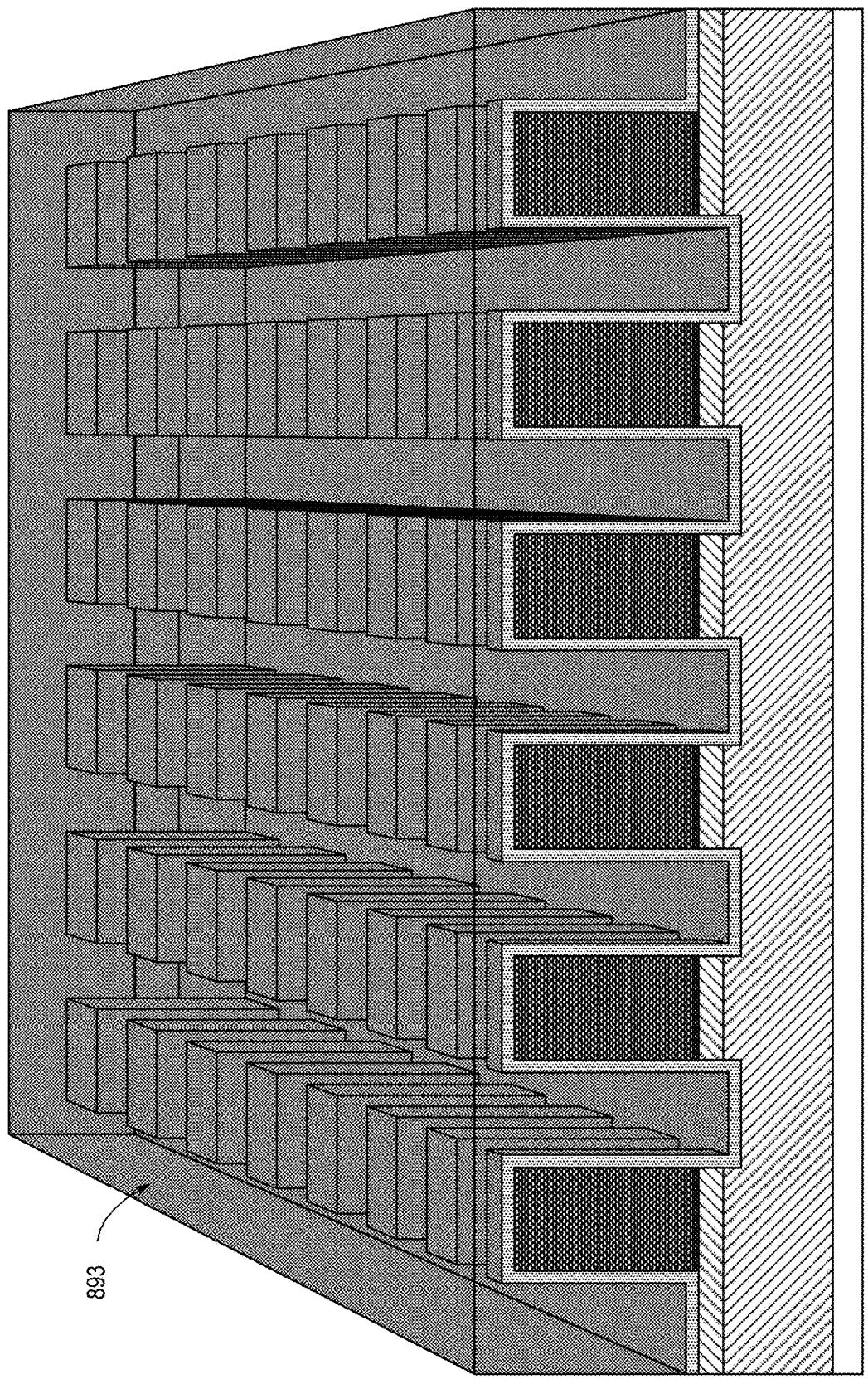

FIG. 8D illustrates liquid crystal or another refractive index tunable dielectric material 893 positioned to fill the extended-depth gaps or channels between the rectangular metal pillars 805. FIG. 8D is from the same perspective as FIG. 8B.

The presently described metal pillar approach described herein can be applied and utilized in conjunction with any of the various arrangements and configurations of two-dimensional arrays of subwavelength resonant elements described in the various disclosures incorporated by reference herein. As illustrated, each rectangular metal pillar 891 and 892 extends from an optically reflective surface 890 but is electrically isolated therefrom by the dielectric layer 895 (e.g., a dielectric via layer) and the dielectric etch-stop layer 896. Each extended-depth gap may be formed by an initial gap between adjacent metal pillars 891 and 892 and a gap extension formed as a cavity that passes through the etch-stop dielectric layer 896 and into the underlying dielectric layer 895.

In some embodiments, the adjustable refractive index material 893, such as liquid crystal, may be applied uniformly as a layer on top of the dielectric etch-stop layer 896 to fill in all the spaces and gaps between all the rectangular metal pillars, including between paired rectangular metal pillars, within the gap extensions, and between neighboring rectangular metal pillar pairs 805. In some embodiments, the two-dimensional array of rectangular metal pillars may be uniformly distributed on the dielectric etch-stop layer 896 with a layer of adjustable refractive index material 893 deposited to fill the gaps therebetween. In such an embodiment, each rectangular metal pillar may be voltage-controlled to modify the refractive index of the adjustable refractive index material 893 between itself and multiple neighboring rectangular metal pillars.

Figure 9:
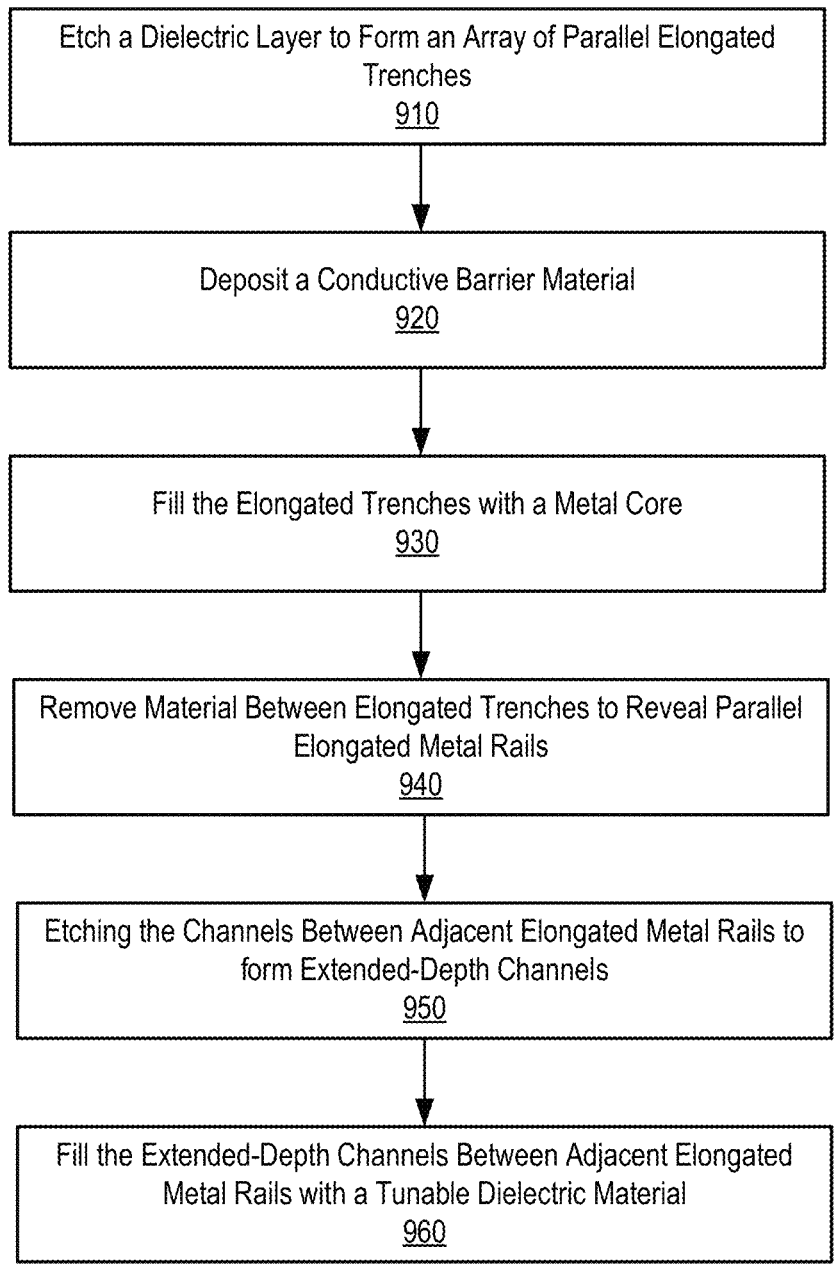
FIG. 9 illustrates a flowchart of an example method to form a tunable optical metasurface with extended-depth channels between metal rails, according to one embodiment.

FIG. 9 illustrates a flowchart of an example method to form a tunable optical metasurface with extended-depth channels between elongated metal rails, according to one embodiment. As illustrated, a dielectric layer is etched, at 910, to form an array of parallel elongated trenches. A conductive barrier material is deposited, at 920, to cover at least a base wall or base surface of each parallel elongated trench (but optionally, the sidewalls and surfaces outside of the trenches when a conformal deposition approach is utilized). The elongated trenches are filled, at 930, with a conductive metal, such as copper, that will ultimately serve as the metal core of each elongated metal rail. Various approaches may be utilized to deposit the conductive metal, including the use of damascene processes, seeding layers, electroless deposition techniques, and the like.

The material between the conductive metal deposited within the elongated trenches is removed, at 940, to reveal or expose the conductive metal deposits as a one-dimensional array of elongated metal rails (or a two-dimensional array of pillars in the context of the examples described in conjunction with FIGS. 8A-8D). The channels are then etched, at 950, deeper to form extended-depth channels that extend deeper into the underlying dielectric layers. The extended-depth channels extend into the underlying dielectrics deeper than the bottom wall of the adjacent elongated metal rails, such that the depth, D, of each extended-depth channel is greater than the height, H, of the adjacent elongated metal rails. The channels between adjacent elongated metal rails are filled, at 960, with a tunable dielectric material, such as liquid crystal.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be understood to encompass at least the following claims and all possible permutations thereof.

What is claimed is:

1. A tunable optical device, comprising:
a dielectric substrate;
an array of elongated metal rails extending from the dielectric substrate and spaced from one another by less than a wavelength of an operational bandwidth to form channels between adjacent elongated metal rails, wherein each elongated metal rail extends to a height, H, from the dielectric substrate, such that each channel has a channel depth, $D_C$, corresponding to the height, H;
a plurality of channel extensions formed in the dielectric substrate to an extension depth, $D_E$, wherein each channel extension is positioned beneath a corresponding channel to form an extended-depth channel with an extended depth, $D_{ED}$, corresponding to the sum of the channel depth, $D_C$, and the extension depth, $D_E$, wherein the extended depth, $D_{ED}$ is greater than the height, H; and
a tunable dielectric material that has a tunable refractive index positioned to fill each extended-depth channel, including to fill each channel extension and corresponding channel.

2. The device of claim 1, wherein opposing sidewalls of each elongated metal rail are substantially parallel to one another.

3. The device of claim 1, further comprising:
a conductive barrier material positioned between a base wall of each elongated metal rail and the dielectric substrate.

4. The device of claim 3, wherein the conductive barrier material comprises one of tantalum (Ta), tantalum nitride (TaN), and titanium nitride (TiN).

5. The device of claim 1, wherein the tunable dielectric material comprises one or more of: liquid crystal, an electro-optic polymer, a chalcogenide glass, and a semiconductor material.

6. The device of claim 1, wherein each elongated metal rail comprises a metal core, such that each elongated metal rail comprises a copper rail.

7. The device of claim 1, further comprising:
a passivation coating on opposing sidewalls and a top wall of each elongated metal rail.

8. The device of claim 7, wherein the passivation coating comprises a silicon nitride (SiN) layer.

9. The device of claim 1, wherein a width of each elongated metal rail is less than a smallest wavelength of the operational bandwidth, and wherein each elongated metal rail extends from the dielectric substrate to a height less than the smallest wavelength of the operational bandwidth.

10. A tunable optical device, comprising:
a dielectric substrate;
an array of metal elements extending from the dielectric substrate and spaced from one another by less than a wavelength of an operational bandwidth to form gaps between adjacent metal elements, wherein each metal element extends to a height, H, from the dielectric substrate, such that each gap has a depth, D, that corresponds to the height, H;
a plurality of gap extensions formed within the dielectric substrate, wherein each gap extension is positioned beneath a corresponding gap to form an extended-depth gap with an extended depth, $D_{ED}$, that is greater than the height, H; and
a tunable dielectric material that has a tunable refractive index positioned to fill the extended depth, $D_{ED}$, of the extended-depth gaps.

11. The device of claim 10, wherein the tunable dielectric material comprises one or more of: liquid crystal, an electro-optic polymer, a chalcogenide glass, and a semiconductor material.

12. The device of claim 10, wherein opposing sidewalls of each metal element are substantially parallel to one another.

13. The device of claim 10, further comprising:
a conductive barrier material positioned between a base wall of each metal element and the dielectric substrate.

14. The device of claim 13, wherein the conductive barrier material comprises one of tantalum (Ta), tantalum nitride (TaN), and titanium nitride (TiN).

15. The device of claim 10, further comprising:
a passivation coating on opposing sidewalls and a top wall of each elongated metal rail.

16. The device of claim 15, wherein the passivation coating comprises a silicon nitride (SiN) layer.

17. The device of claim 10, wherein the array of metal elements comprises a two-dimensional array of metal antenna resonator elements having subwavelength widths, lengths, and heights.

* * * * *